(12) United States Patent
Sasaki et al.

(10) Patent No.: US 10,535,467 B2
(45) Date of Patent: *Jan. 14, 2020

(54) MULTI-LAYER CERAMIC ELECTRONIC COMPONENT HAVING SIDE FACE EXTERNAL ELECTRODE AND METHOD OF PRODUCING THE SAME

(71) Applicant: Taiyo Yuden Co., Ltd., Tokyo (JP)

(72) Inventors: Takashi Sasaki, Tokyo (JP); Tomohiko Zaima, Tokyo (JP); Shin Nakayasu, Tokyo (JP); Akira Furusawa, Tokyo (JP); Fukio Kinoshita, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,712

(22) Filed: Aug. 9, 2018

(65) Prior Publication Data

US 2018/0350522 A1 Dec. 6, 2018

Related U.S. Application Data

(63) Continuation of application No. 15/221,111, filed on Jul. 27, 2016, now Pat. No. 10,074,482.

(30) Foreign Application Priority Data

Jul. 27, 2015 (JP) .................................. 2015-148128
Dec. 17, 2015 (JP) .................................. 2015-245923

(51) Int. Cl.
*H01G 4/232* (2006.01)
*H01G 4/30* (2006.01)
(Continued)

(52) U.S. Cl.
CPC ............ *H01G 4/232* (2013.01); *H01G 4/0085* (2013.01); *H01G 4/1227* (2013.01); *H01G 4/30* (2013.01)

(58) Field of Classification Search
CPC .... H01G 4/30; H01G 4/40085; H01G 4/1227; H01G 4/232; H01G 4/248; H01G 4/12; H01G 4/005
See application file for complete search history.

(56) References Cited

U.S. PATENT DOCUMENTS 10,074,482 B2 * 9/2018 Sasaki ..................... H01G 4/30
2012/0188684 A1 7/2012 Akazawa et al.
(Continued)

FOREIGN PATENT DOCUMENTS

JP 2000-058376 A 2/2000
JP 2003-007575 A 1/2003
(Continued)

OTHER PUBLICATIONS

Office Action dated Jan. 30, 2018 in Japanese Application No. 2015-245923, along with its English translation.
(Continued)

*Primary Examiner* — David M Sinclair
(74) *Attorney, Agent, or Firm* — Saliwanchik, Lloyd & Eisenschenk

(57) ABSTRACT

There is provided a multi-layer ceramic electronic component includes a ceramic body, an end external electrode unit, a side face external electrode unit. The ceramic body includes a pair of end faces, a pair of first side faces, and a pair of second side faces all of which are faced each other, respectively. The ceramic body includes a plurality of ceramic layers and an internal electrode unit. A plurality of the ceramic layers extend along a pair of the first side faces, and are laminated along a pair of the second side faces. The
(Continued)

internal electrode unit includes first and second internal electrodes disposed alternately between a plurality of the ceramic layers, the first internal electrodes are drawn to both ends of a pair of the end faces, and the second internal electrodes are dawn to both ends of a pair of the second side faces. The end external electrode unit is connected to the first internal electrodes. The side face external electrode unit goes around from one of a pair of the first and second side faces to the other and are connected directly or indirectly each other at the other. There is also provided a method of producing the same.

17 Claims, 18 Drawing Sheets

(51) Int. Cl.
  *H01G 4/008* (2006.01)
  *H01G 4/12* (2006.01)

(56) References Cited

U.S. PATENT DOCUMENTS

| | | |
|---|---|---|
| 2012/0320495 A1 | 12/2012 | Akazawa et al. |
| 2013/0201601 A1 | 8/2013 | Nishisaka et al. |
| 2013/0222971 A1 | 8/2013 | Nishimura et al. |
| 2014/0029159 A1 | 1/2014 | Shimada et al. |
| 2014/0126106 A1 | 5/2014 | Sawada |
| 2015/0109718 A1 | 4/2015 | Choi |
| 2017/0032897 A1* | 2/2017 | Sasaki ...................... H01G 4/30 |

FOREIGN PATENT DOCUMENTS

| | | |
|---|---|---|
| JP | 2009-239094 A | 10/2009 |
| JP | 2012-028503 A | 2/2012 |
| JP | 2014-027077 A | 2/2014 |
| KR | 10-2012-0085192 A | 7/2012 |
| KR | 10-1457898 B1 | 11/2014 |
| KR | 10-1509150 B1 | 4/2015 |

OTHER PUBLICATIONS

Decision of Refusal dated Nov. 28, 2017 in Korean Application No. 10-2016-0093550, along with its English translation.

Office Action dated Jun. 20, 2017 in Korean Application No. 10-2016-0093550, along with its English translation.

* cited by examiner

MULTI-LAYER CERAMIC ELECTRONIC COMPONENT HAVING SIDE FACE EXTERNAL ELECTRODE AND METHOD OF PRODUCING THE SAME

CROSS-REFERENCE TO RELATED APPLICATIONS

This application is a continuation of U.S. application Ser. No. 15/221,111, filed Jul. 27, 2016, which claims the benefit under 35 U.S.C. § 119 of Japanese Patent Application Nos. 2015-245923, filed Dec. 17, 2015; and 2015-148128, filed Jul. 27, 2015, which are herein incorporated by reference in their entirety.

BACKGROUND OF THE INVENTION

The present invention relates to a multi-layer ceramic electronic component and a method of producing the same.

A through-type multi-layer ceramic capacitor is one of multi-layer ceramic electronic components, and is known as a multi-layer ceramic capacitor that reduces inductance components. In general, the through-type multi-layer ceramic capacitor includes end face external electrodes that connect internal electrodes drawn to end faces, and side face external electrodes that connect internal electrodes drawn to side faces.

The through-type multi-layer ceramic capacitor is mounted on a component packaging substrate or a built-in component substrate. For example, when the through-type multi-layer ceramic capacitor is mounted on a built-in component substrate having vias (through-hole electrodes), side face external electrodes are preferably connectable to the vias. Such configuration is feasible to provide not two side faces to which the internal electrodes are drawn, but all four side faces with the side face external electrodes.

Japanese Patent Application Laid-open No. 2014-27077 discloses a technology that provides four side faces of a through-type multi-layer ceramic capacitor with side face external electrodes. In the technology, an electrical conductive paste is applied and baked to each of the four side faces to form side face external electrodes. Specifically, in the technology, the electrical conductive paste is applied to go around the side faces adjacent to each side face in order to ensure reliability.

BRIEF SUMMARY

In the technology disclosed in the above-described literature, the electrical conductive paste is overlapped doubly beyond ridges connecting each side face. This results in excess electrical conductive paste in the vicinity of the ridges, and the electrical conductive paste spreads to the end faces of the ridges. Therefore, in a through-type multi-layer ceramic capacitor provided by the technology, side face external electrodes are easily widen in the vicinity of the ridges.

If there are wide side face external electrodes, a distance between an end face external electrode and a side face external electrode becomes short. This may easily cause insulation failure of the through-type multi-layer ceramic capacitor, for example, in a damp heat test.

In view of the circumstances as described above, an object of the present invention is to provide a multi-layer ceramic electronic component where insulation failure less occurs and a method of producing the same.

In order to achieve the object, a multi-layer ceramic electronic component according to an embodiment of the present invention includes a ceramic body, an end external electrode unit, a side face external electrode unit.

The ceramic body includes a pair of end faces, a pair of first side faces, and a pair of second side faces all of which are faced each other, respectively. The ceramic body includes a plurality of ceramic layers and an internal electrode unit. A plurality of the ceramic layers extend along a pair of the first side faces, and are laminated along a pair of the second side faces. The internal electrode unit includes first and second internal electrodes disposed alternately between a plurality of the ceramic layers, the first internal electrodes are drawn to both ends of a pair of the end faces, and the second internal electrodes are dawn to both ends of a pair of the second side faces.

The end external electrode unit is connected to the first internal electrodes.

The side face external electrode unit goes around from one of a pair of the first and second side faces to the other and are connected directly or indirectly each other at the other.

By the configuration, only one of the first and second side face external electrodes is disposed in the vicinity of the ridges that connect the first and second side faces of the ceramic body. In other words, the side face external electrodes do not overlap beyond ridges of the first and second side face external electrodes. Accordingly, it can inhibit the widths of the side face external electrode unit from widening in the vicinity of the ridges. The configuration can provides the multi-layer ceramic electronic component where insulation failure less occurs.

The first and second side face external electrodes may go around from a pair of the first side faces to a plurality of the second side faces, and may be connected each other at a pair of the second side faces.

By the configuration, only any one of the first and second side face external electrodes where no internal electrode unit is drawn is disposed. Accordingly, the flatness of the side face external electrodes is not degraded. In this manner, when the multi-layer ceramic electronic component is mounted such that the first side faces are faced to the mounting surface of the substrate, the multi-layer ceramic electronic component can keep a proper attitude.

Any one of the first and second side face external electrodes may be connected to a via formed on a built-in component substrate in any one of a pair of the first side faces.

By the configuration, the multi-layer ceramic electronic component mounted to the built-in component substrate can keep a proper attitude, and the side face external electrodes can be easily connected to the via of the built-in component substrate.

Any one of the first and second side face external electrodes may be connected to all of the second internal electrodes not via the other in a pair of the second side faces.

By the configuration, the second internal electrodes drawn to a pair of the second side faces are collectively connected by any of the first and second side face external electrodes. In this manner, the second internal electrodes and the side face external electrodes can be connected more reliably.

The side face external electrode unit may further include a third side face external electrode that connects the first side face external electrode and the second side face external electrode.

By the configuration, the use of the third side face external electrode allows a go-around amount of the first and second side face external electrodes to be small, thereby easily forming the first and second side face external electrodes.

The first and second side face external electrodes may go around from a pair of the first side faces to a pair of the second side faces, and may be connected each other at a pair of second side faces.

The third side face external electrode may be connected to the second internal electrode.

By the configuration, the second internal electrodes drawn to a pair of the second side faces are collectively connected by the third side face external electrodes. In this manner, the second internal electrodes and the side face external electrodes can be connected more reliably.

At least one of widths of the first, second, and third side face external electrodes may be relatively narrow in a direction perpendicular to a pair of the end faces.

A width of the third side face external electrode may be narrower than widths of the first and second side face external electrodes in a direction perpendicular to a pair of the end faces.

By the configuration, by forming a relatively narrow width on the side face external electrode unit, distances between the side face external electrode unit and the end face external electrodes can be widen in the part of interest. In this way, a short circuit between the side face external electrode unit and the end face external electrodes can be inhibited.

In addition, by relatively widen the width of the side face external electrode unit connected to the mounting surface of the substrate, a good connection between the side face external electrode unit and the mounting surface of the substrate can be easily provided.

A thickness in a direction perpendicular to a pair of first side faces may be 50% or less of a width in a direction perpendicular to a pair of second side faces in the ceramic body.

A thickness of the ceramic body in a direction perpendicular to a pair of the first side faces may be 80% or less of a width of the side face external electrode unit in a direction perpendicular to a pair of the end faces.

By the configurations, as a go-around amount of the first and second side face external electrodes is small, the side face external electrode unit can be easily formed.

In a method of producing a multi-layer ceramic electronic component according to an embodiment of the present invention, a ceramic body including a pair of end faces, a pair of first side faces, and a pair of second side faces all of which are faced each other is prepared. The ceramic body has a plurality of ceramic layers and an internal electrode unit. A plurality of the ceramic layers extend along a pair of the first side faces and are laminated along a pair of the second side faces. The internal electrode unit has first and second internal electrodes disposed alternately between a plurality of the ceramic layers, the first internal electrodes are drawn to both ends of a pair of the end faces, and the second internal electrodes are dawn to both ends of a pair of the second side faces.

An end external electrode unit connected to the first internal electrodes are disposed at the both ends.

There is disposed a side face external electrode unit connected to the second internal electrodes and having first and second side face external electrodes that go around from one of a pair of the first and second side faces to the other and are connected directly or indirectly each other at the other.

A third side face external electrode that connects the first and second side face external electrodes to the other in a pair of the first and second side faces may be disposed.

There can be provided a multi-layer ceramic electronic component where insulation failure less occurs and a production method thereof.

These and other objects, features and advantages of the present invention will become more apparent in light of the following detailed description of best mode embodiments thereof, as illustrated in the accompanying drawings.

DETAILED DESCRIPTION

Hereinafter, an embodiment of the present invention will be described with reference to the drawings.

In the figure, an X axis, a Y axis and a Z axis orthogonal to each other are shown, as appropriate. The X axis, the Y axis and the Z axis are common in all figures.

First Embodiment

[Overall Configuration of Multi-Layer Ceramic Capacitor 10]

Figure 1:
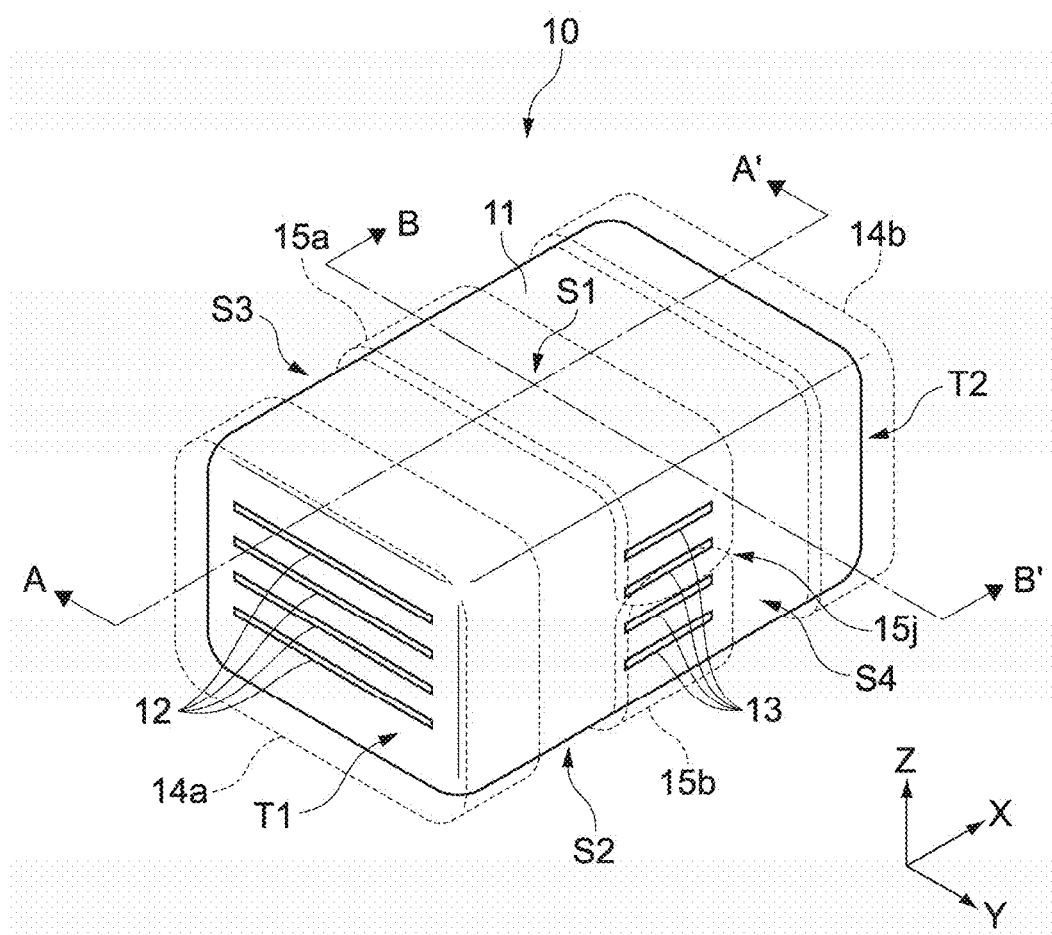
FIG. 1 is a perspective diagram of a multi-layer ceramic capacitor according to a first embodiment of the present invention.
Figure 2:
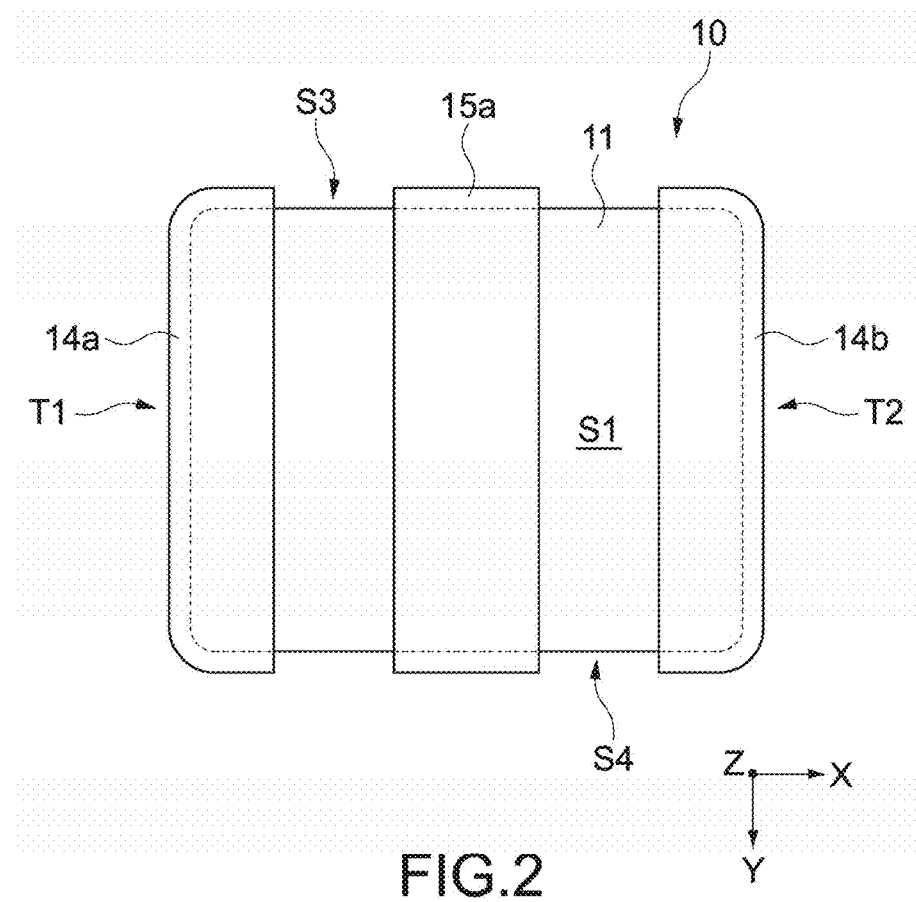
FIG. 2 is a plan diagram of the multi-layer ceramic capacitor.
Figure 3:
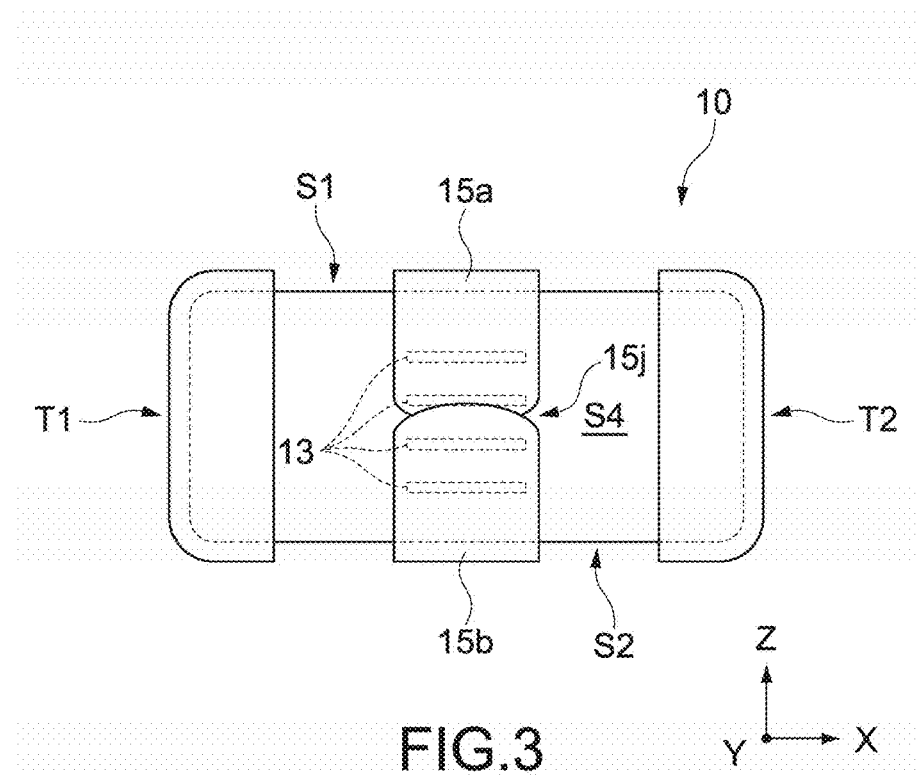
FIG. 3 is a side diagram of the multi-layer ceramic capacitor.

FIG. 1 is a perspective diagram of a multi-layer ceramic capacitor 10 according to a first embodiment of the present invention. FIG. 2 is a plan diagram of the multi-layer ceramic capacitor 10. FIG. 3 is a side diagram of the multi-layer ceramic capacitor 10.

The multi-layer ceramic capacitor 10 is a through-type (three-terminal type) multi-layer ceramic capacitor including a ceramic body 11, first and second end external electrodes 14a, 14b, and first and second side face external electrodes 15a, 15b. In the multi-layer ceramic capacitor 10, the first and second end external electrodes 14a, 14b configure an end external electrode unit, and the first and second side face external electrodes 15a, 15b configure a side face external electrode unit acting as an opposite to the end external electrode unit.

In the multi-layer ceramic capacitor 10, the first and second end external electrodes 14a, 14b are configured as through electrodes, and the first and second side face external electrodes 15a, 15b are configured as ground electrodes, for example. In FIG. 1, the end external electrodes 14a, 14b and the side face external electrodes 15a, 15b are shown in dashed lines, and the ceramic body 11 is shown transparently.

The ceramic body 11 is formed in an almost rectangular parallelepiped shape having ridges extending substantially in the X axis, Y axis and Z axis directions. The ridges of the ceramic body 11 are chamfered and are configured as roundish curved surfaces. The ceramic body 11 includes a pair of end faces T1, T2 perpendicular to the X axis, a pair of first side faces S1, S2 perpendicular to the Z axis, and a pair of second side faces S3, S4 to the Y axis. Each faces T1, T2, S1, S2, S3, S4 of the ceramic body 11 may be flat or curved.

The multi-layer ceramic capacitor 10 is packaged such that the first side face S1 or the first side face S2 is faced to a packaging face of the substrate, for example. The multi-layer ceramic capacitor 10 is mountable to a built-in component substrate having vias (through-hole electrodes), for example. In this case, the first end external electrode 14a and the second end external electrode 14b, and the first side face external electrode 15a or the second side face external electrode 15b are connected to the vias formed on the substrate in the first side face S1 or the first side face S2 facing to the packaging face of the built-in component substrate.

The ceramic body 11 includes first and second internal electrodes 12, 13 extending along an XY plane disposed alternately in the Z axis direction. The first internal electrodes 12 are drawn to end faces T1, T2, respectively, and the second internal electrodes 13 are drawn to the second side faces S3, S4, respectively. The first and second internal electrodes 12, 13 that mutually form a pair configure an internal electrode unit of the multi-layer ceramic capacitor 10.

In the present invention, "disposed alternately" is not limited to the case that all first and second internal electrodes 12, 13 are entirely disposed alternately, but also may include the case that a plurality of first internal electrodes 12 or second internal electrodes 13 are successively disposed in a part of a laminate structure.

The end external electrodes 14a, 14b cover both ends including the end faces T1, T2 of the ceramic body 11, and connect first internal electrodes 12 drawn to the end faces T1, T2. The end external electrodes 14a, 14b extend from the end faces T1, T2 to the side faces S1, S2, S3, S4, and each has a cup shape open in the X axis direction.

The side face external electrodes 15a, 15b are disposed at a center area of the ceramic body 11 in the X axis direction spaced apart from the end external electrodes 14a, 14b, and connect the second internal electrodes 13 drawn to the second side faces S3, S4.

The side face external electrodes 15a, 15b cover the first side faces S1, S2 of the ceramic body 11, and go around from the first side faces S1, S2 to the second side faces S3, S4. The side face external electrodes 15a, 15b are connected each other at connection parts 15j at a center area of the second side faces S3, S4 in the Z axis direction. By the configuration, the side face external electrodes 15a, 15b are successive along all side faces S1, S2, S3, S4.

Figure 4:
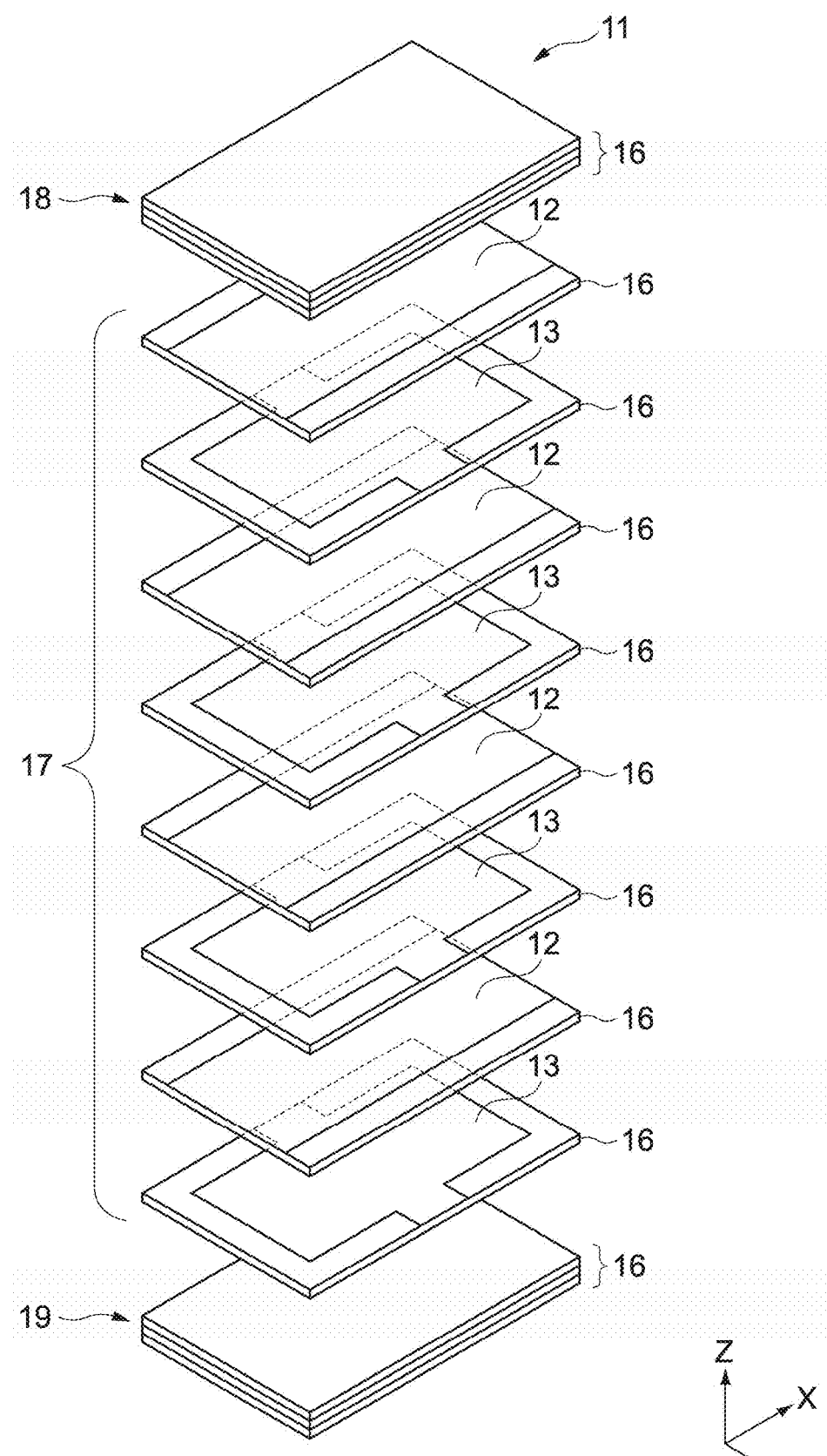
FIG. 4 is an exploded perspective diagram of the multi-layer ceramic capacitor.
Figure 5:
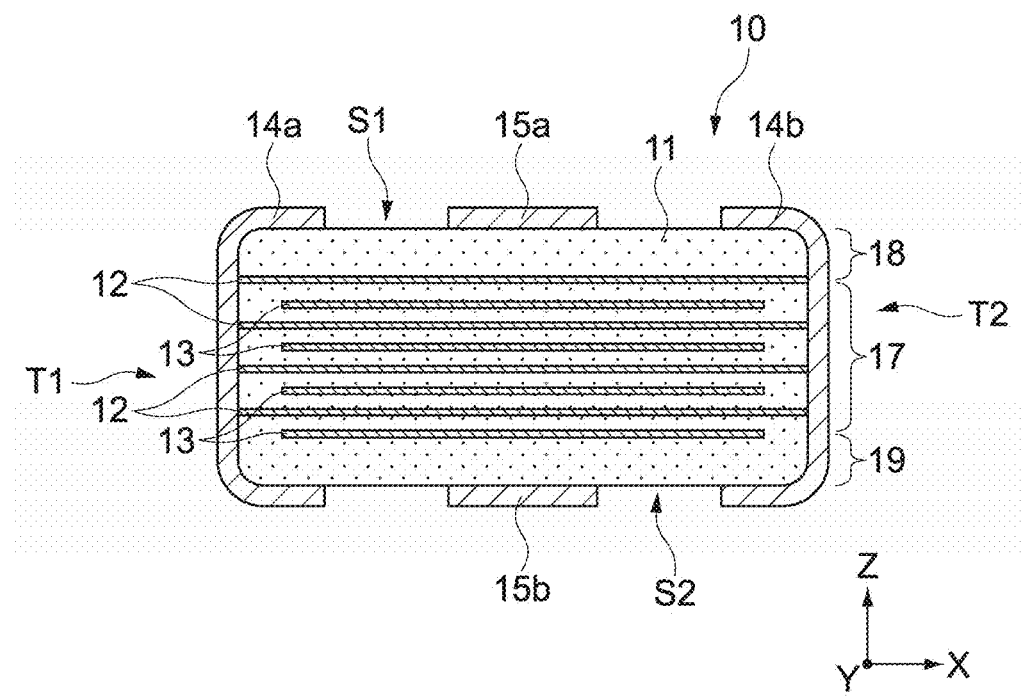
FIG. 5 is a sectional diagram along an A-A' line of the multi-layer ceramic capacitor in FIG. 1.
Figure 6:
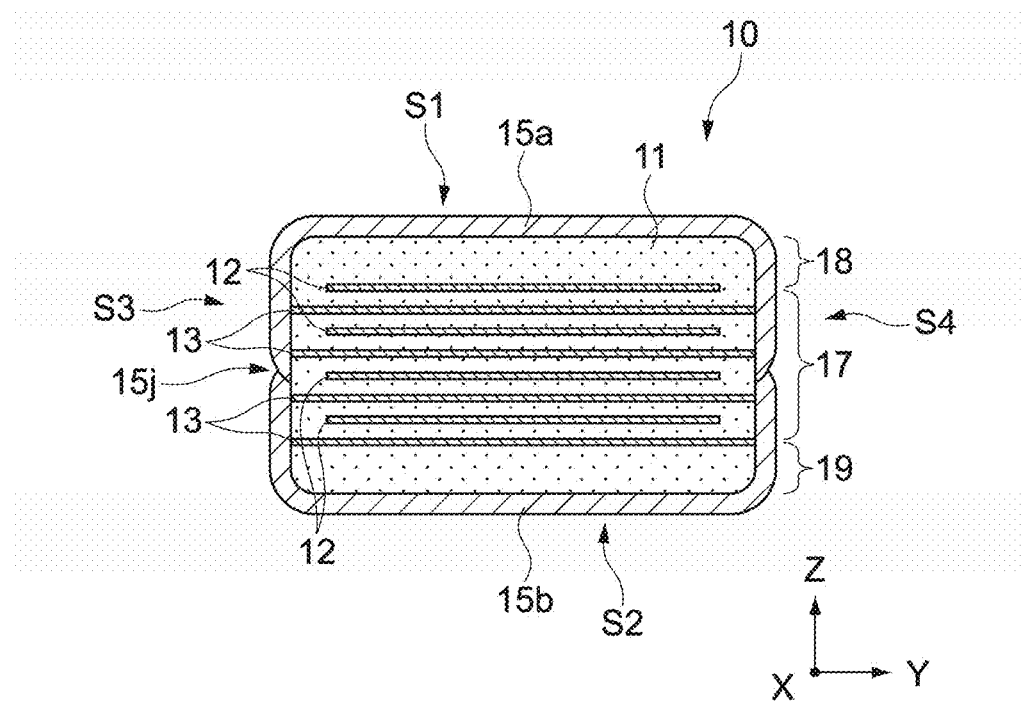
FIG. 6 is a sectional diagram along an B-B' line of the multi-layer ceramic capacitor in FIG. 1.

FIG. 4 is an exploded perspective diagram of the ceramic body 11. FIG. 5 is a sectional diagram along an A-A' line of the multi-layer ceramic capacitor 10 in FIG. 1. FIG. 6 is a sectional diagram along a B-B' line of the multi-layer ceramic capacitor 10 in FIG. 1. Although the ceramic body 11 sintered cannot be disassembled actually, the ceramic body 11 is disassembled in FIG. 4 for explanation convenience.

The ceramic body 11 is configured of a capacitance forming part 17 where the internal electrodes 12, 13 are disposed at a center area in the Z axis direction, and covers 18, 19 sandwiching the capacitance forming part 17 in the Z axis direction. The capacitance forming part 17 has a function to form electrostatic capacitance. The covers 18, 19 do not form electrostatic capacitance, and has a function to mainly protect the capacitance forming part 17.

Also, as shown in FIG. 4, the ceramic body 11 has a laminate structure where a plurality of ceramic layers 16 extending along an XY plane are laminated in the Z axis direction. In the capacitance forming part 17, the ceramic layer 16 where the first internal electrode 12 is formed and the ceramic layer 16 where the second internal electrode 13 is formed are alternately laminated. In the covers 18, 19, a plurality of the ceramic layers 16 where no internal electrodes 12, 13 are formed are laminated.

The first internal electrodes 12 are in strip shapes, and are drawn to the end faces T1, T2 in equal widths of the faces facing to the second internal electrodes 13. The second internal electrodes 13 are drawn to the second side face S3, S4 in widths narrower than the faces facing to the first internal electrodes 12 at the center area in the X axis direction. A lamination number of the ceramic layers 16 in the capacitance forming part 17 and the covers 18, 19 may be determined arbitrarily based on a performance and a shape that the multi-layer ceramic capacitor 10 requires.

In the capacitance forming part 17, the first internal electrodes 12 are connected each other by the end external electrode 14a, 14b, the second internal electrodes 13 are connected each other by the side face external electrode 15a, 15b. Accordingly, when a voltage is applied between the end external electrodes 14a, 14b and the side face external electrodes 15a, 15b, the voltage is applied to the ceramic layer 16 between the internal electrodes 12, 13. In this manner, an electric charge corresponding to the voltage is stored in the capacitance forming part 17.

Each ceramic layer 16 is formed of dielectric ceramics.

As the dielectric ceramics forming each ceramic layer 16, a material mainly including barium titanate, strontium titanate, calcium titanate, magnesium titanate, calcium zirconate, calcium titanate zirconate, barium zirconate, titanium oxide or the like may be available, for example.

Since the covers 18, 19 do not form electrostatic capacitance, dielectric ceramics forming the ceramic layer 16 of the covers 18, 19 do not need to have a high dielectric constant. Accordingly, different dielectric ceramics may be used as the ceramic layers 16 of the covers 18, 19 and the ceramic layers 16 of the capacitance forming part 17. However, from a standpoint of structural stability, it is preferable that the same dielectric ceramics are used in the ceramic layers 16 of the covers 18, 19 and the ceramic layers 16 of the capacitance forming part 17.

The internal electrodes 12, 13 are formed of a good conductor. As the good conductor forming the internal electrodes 12, 13, metal or alloy mainly including nickel, copper, palladium, platinum, silver, gold or the like may be available, for example.

The end external electrodes 14a, 14b and the side face external electrodes 15a, 15b are formed of a good conductor. As the good conductor forming the end external electrodes 14a, 14b and the side face external electrodes 15a, 15b, metal or alloy mainly including nickel, copper, palladium, platinum, silver, gold or the like may be available, for example.

The end external electrodes 14a, 14b and the side face external electrodes 15a, 15b may be a monolayer structure or a multi-layer structure. The multi-layer structure may be a two-layer structure of a base film and a surface film, or a three-layer structure of a base film, an intermediate film and a surface film, for example.

The base film may be a baked film of metal or alloy mainly including nickel, copper, palladium, platinum, silver, gold or the like may be available, for example.

The intermediate film may be metal or alloy mainly including platinum, palladium, gold, copper, nickel or the like may be available, for example.

The surface film may be metal or alloy mainly including copper, tin, palladium, gold, zinc or the like may be available, for example.

In the multi-layer ceramic capacitor 10 according to the embodiment, by disposing the connection parts 15j to which the side face external electrodes 15a, 15b are connected on the second side faces S3, S4, the first side face external electrode 15a and the second side face external electrode 15b are not overlapped beyond the ridges connecting the first side faces S1, S2 and the second side faces S3, S4. In this manner, it can increase the widths of the side face external electrode 15a, 15b near the ridges during a production process.

Thus, in the multi-layer ceramic capacitor 10, as the widths of the side face external electrode 15a, 15b near the ridges are not increased, it can ensure sufficient wide distances between the end external electrodes 14a, 14b and the side face external electrodes 15a, 15b. Accordingly, in the multi-layer ceramic capacitor 10, an insulation failure less occurs for example, in a damp heat test.

Figure 7:
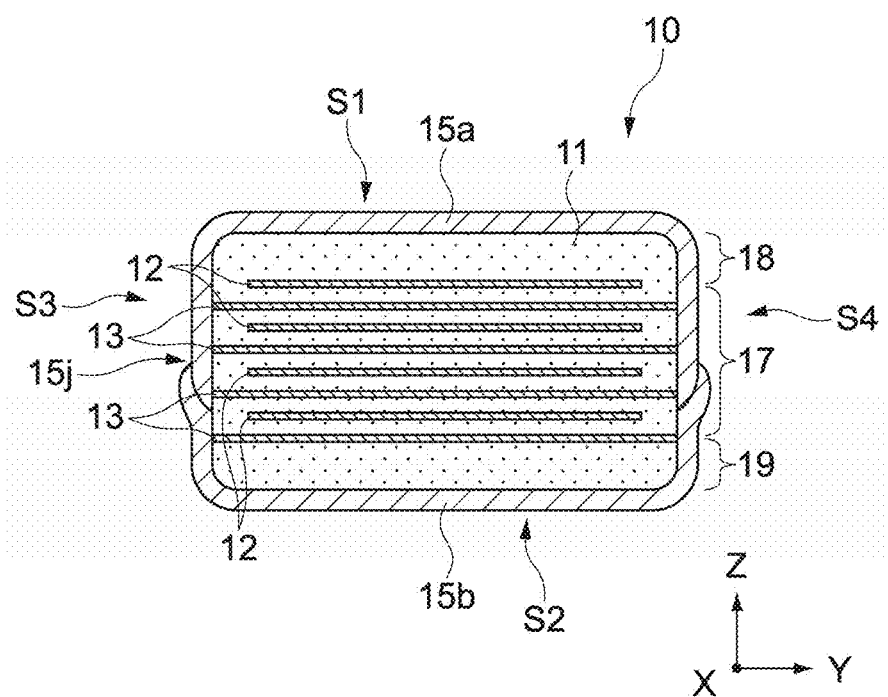
FIG. 7 is a sectional diagram along an B-B' line of the multi-layer ceramic capacitor in FIG. 1.

In addition, the side face external electrodes 15a, 15b easily tend to have uneven thicknesses in the connection part 15j. Specifically, the connection parts 15j are ends of the side face external electrodes 15a, 15b as shown in FIG. 6, and may be thin. In an opposite way, the connection parts 15j may be thick by overlapping the side face external electrodes 15a, 15b as shown in FIG. 7. Accordingly, the faces on which the connection parts 15j are disposed easily tend to have degraded flatness.

In this regard, in the multi-layer ceramic capacitor 10, the connection parts 15j are disposed not on the first side face S1, S2 that are mounting surfaces of the substrate, but on the second side faces S3, S4. That is to say, a series of the side face external electrodes 15a, 15b having a uniform thickness are disposed at the first side faces S1, S2. Thus, the side face external electrodes 15a, 15bs have good flatness on the first side faces S1, S2.

In this manner, in the multi-layer ceramic capacitor 10, the flatness of the side face external electrodes 15a, 15b is kept on the first side faces S1, S2. Therefore, when the multi-layer ceramic capacitor 10 is mounted such that the first side faces S1, S2 are faced to the mounting surface of the substrate, the multi-layer ceramic capacitor 10 can keep a proper attitude without tilting. In addition, in the first side face S1 or the first side face S2, when the first side face external electrode 15a or the second side face external electrode 15b is connected to the via of the substrate, the first side face external electrode 15a or the second side face external electrode 15b is easily connected.

Furthermore, an aspect ratio of dimensions of the ceramic body 11 in the X axis, Y axis and Z axis directions can be determined arbitrarily based on a performance and a shape that the multi-layer ceramic capacitor 10 requires.

In particular, the present invention is useful for a thin ceramic capacitor 10 where the thickness of the ceramic body 11 in the Z axis direction is 100% or less of the width in the Y axis direction. In other words, in the thin ceramic capacitor 10, as a go-around amount of the side face external electrodes 15a, 15b can be made small, the side face external electrodes 15a, 15b can be easily connected. In particular, when the thickness of the ceramic body 11 in the Z axis direction is 50% or less of the width in the Y axis direction, it has been confirmed that an especially high manufacturing efficiency is provided.

Similarly, the present invention is also useful for a thin ceramic capacitor 10 where the thickness of the ceramic body 11 in the X axis direction is 100% or less of the width of the side face external electrodes 15a, 15b in the X axis direction. In particular, when the thickness of the ceramic body 11 in the Z axis direction is 80% or less of the width of the side face external electrodes 15a, 15b in the X axis direction, it has been confirmed that an especially high manufacturing efficiency is provided.

[Method of Producing Multi-Layer Ceramic Capacitor 10]

Figure 8:
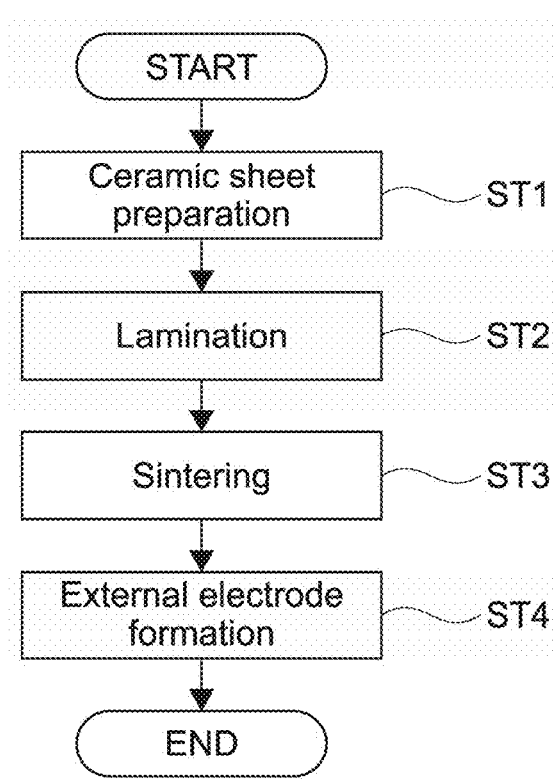
FIG. 8 is a flow chart showing a method of producing the multi-layer ceramic capacitor.

FIG. 8 is a flow chart showing a method of producing the multi-layer ceramic capacitor. FIGS. 9A to 11 are diagrams of a production process of the multi-layer ceramic capacitor 10. Hereinafter, the method of producing the multi-layer ceramic capacitor 10 will be described along FIG. 8 referring to FIGS. 9A to 11 as appropriate.

(Step ST1: Ceramic Sheet Preparation Process)

In step ST1, an unsintered ceramic sheet 16U is prepared.

Figure 9A:
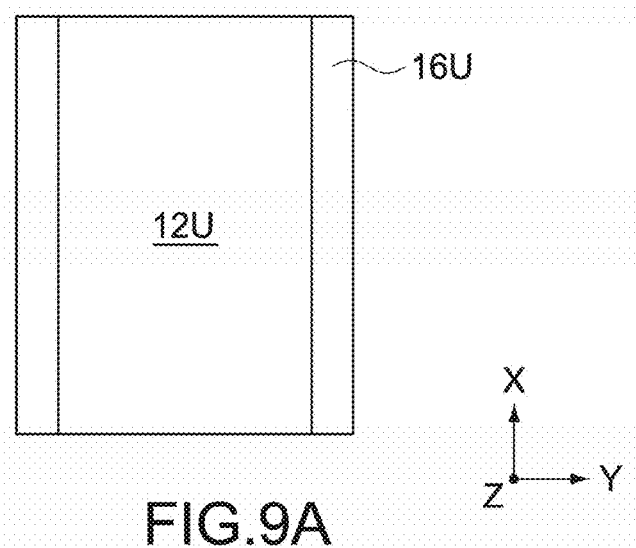
FIG. 9A is a plan diagram of a ceramic sheet used in the production method.
Figure 9B:
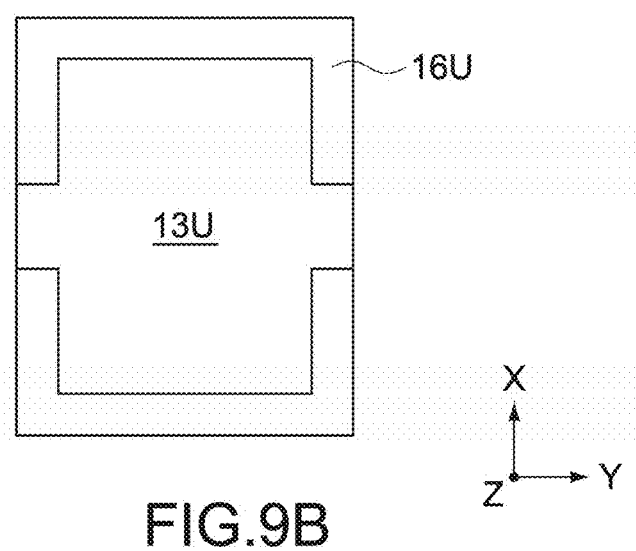
FIG. 9B is a plan diagram of a ceramic sheet used in the production method.
Figure 9C:
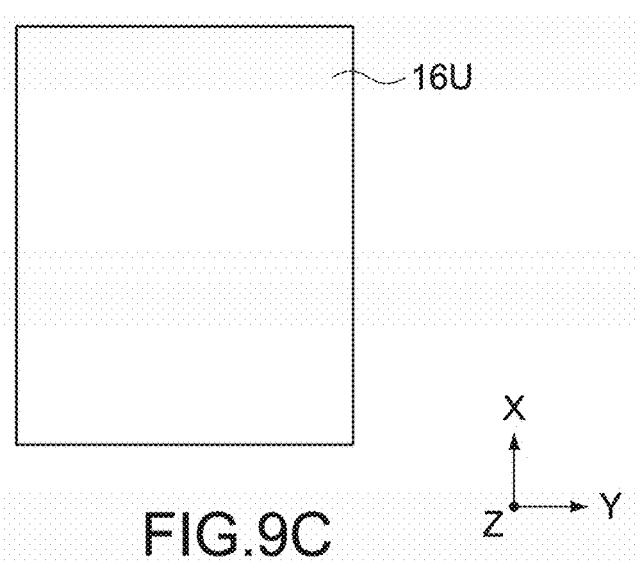
FIG. 9C is a plan diagram of a ceramic sheet used in the production method.
Figure 10:
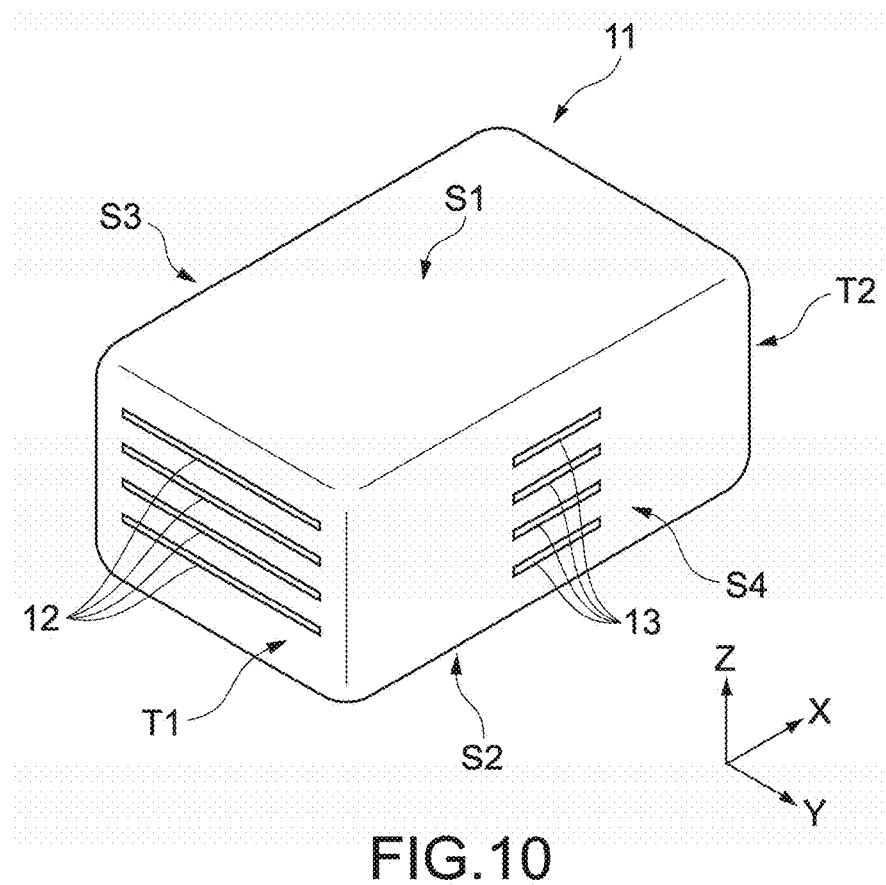
FIG. 10 is a perspective diagram of a ceramic body of the multi-layer ceramic capacitor.

FIGS. 9A to 9C each is a plan diagram of the ceramic sheet 16U prepared in step ST1. Specifically, a ceramic sheet 16U where an unsintered first internal electrode 12U is formed shown in FIG. 9A, a ceramic sheet 16U where an unsintered second internal electrode 13U is formed shown in FIG. 9B, and a ceramic sheet 16U where no internal electrodes 12U, 13U are formed shown in FIG. 9C are prepared.

In order to produce the ceramic sheet 16U, a ceramic slurry is firstly prepared. The ceramic slurry is provided by mixing dielectric ceramics powder (e.g., barium titanate powder), a solvent (e.g., ethanol), a binder (e.g., polyvinyl butyral), and an additive (e.g., dispersant), for example.

By forming the ceramic slurry into a sheet, the ceramic sheet 16U is provided. For the formation of the ceramic slurry, a forming machine such as a die coater and a gravure coater can be used, for example.

In order to form the internal electrodes 12U, 13U in the ceramic sheet 16U, a metal paste is firstly prepared. The metal paste is provided by mixing metal powder (e.g., nickel powder), a solvent (e.g., terpineol), a binder (e.g., ethyl cellulose), and an additive (e.g., dispersant), for example.

Then, the metal paste is printed on the ceramic sheet 16U, thereby forming the internal electrodes 12U, 13U. For printing the metal paste, a printing apparatus such as a screen printer and a gravure printer can be used, for example.

(Step ST2: Lamination Process)

In step ST2, the ceramic sheet 16U prepared in step ST1 is laminated in the Z axis direction. In other words, so as to provide the configuration shown in FIG. 4, respective ceramic sheets 16U shown in FIGS. 9A to 9C are laminated and thermally compressed, thereby providing an unsintered ceramic body 11U. For the lamination of the ceramic sheets 16U, a lamination apparatus such as a movable suction head can be used, for example.

(Step ST3: Sintering Process)

In step ST3, the unsintered ceramic body 11U provided in step ST2 is sintered. Specifically, the unsintered ceramic body 11U is heated and sintered. Then, the unsintered ceramic body 11U is chamfered, e.g., by barrel polishing, thereby providing the ceramic body 11, shown in FIG. 10. For the sintering of the ceramic body 11U, a sintering apparatus such as a tunnel-type sintering furnace and a box-type sintering furnace is used under a reduction atmosphere or a low oxygen partial pressure atmosphere, for example.

(Step ST4: External Electrode Formation Process)

In step ST4, for the ceramic body 11 provided in step ST3, the end external electrodes 14a, 14b and the side face external electrodes 15a, 15b are formed. The end external electrodes 14a, 14b and the side face external electrodes 15a, 15b are formed by applying an electrical conductive paste to the ceramic body 11, which is baked.

Figure 11A:
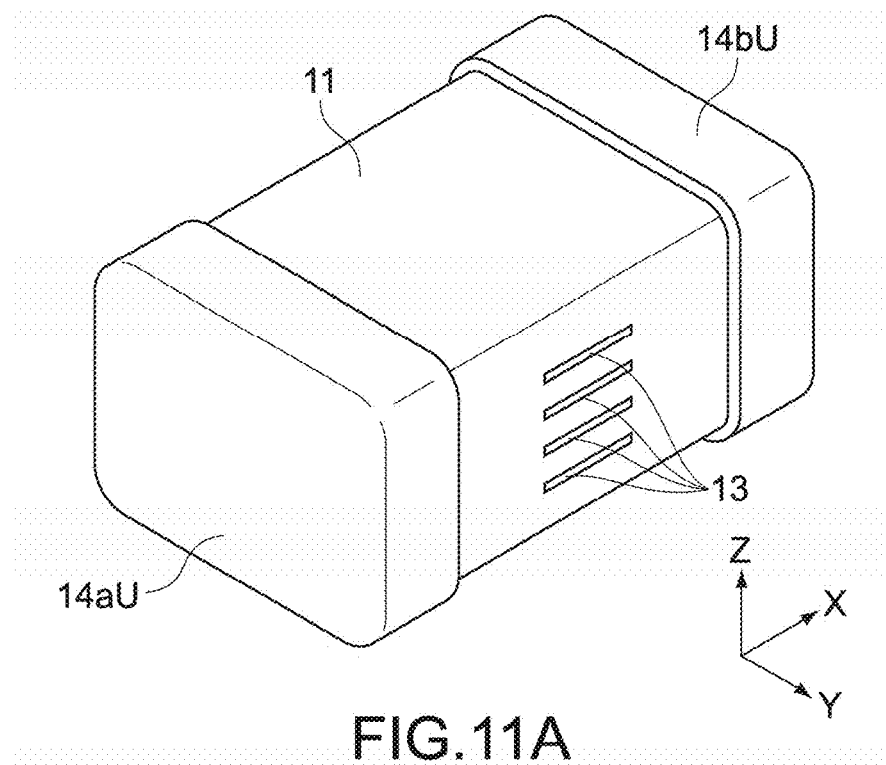
FIG. 11A is a perspective diagram showing a process of forming an external electrode in the production method.
Figure 11B:
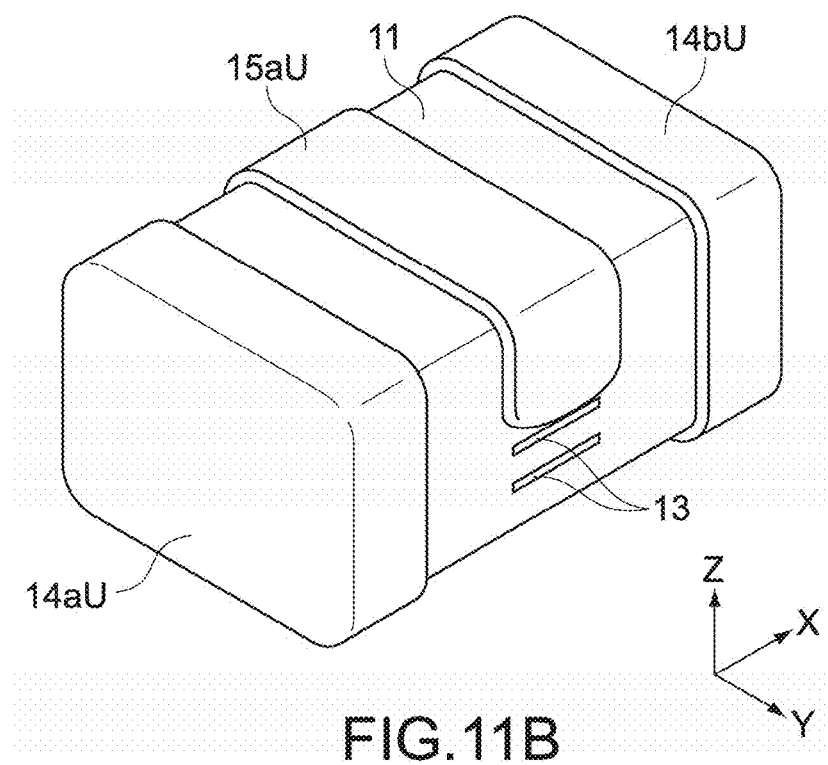
FIG. 11B is a perspective diagram showing a process of forming an external electrode in the production method.
Figure 11C:
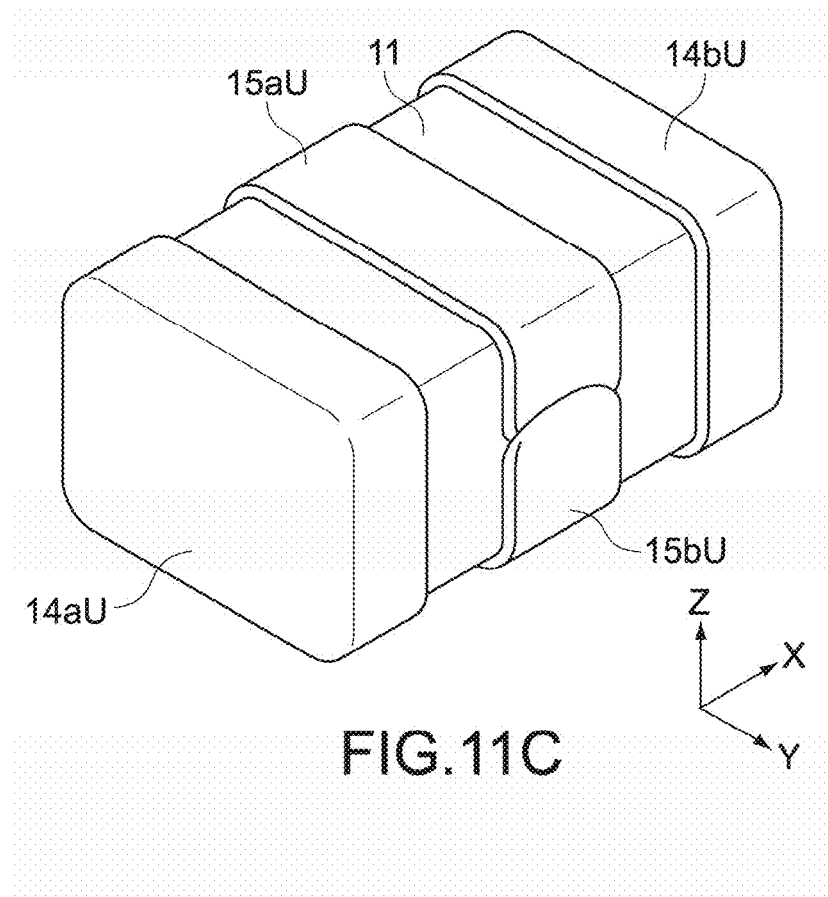
FIG. 11C is a perspective diagram showing a process of forming an external electrode in the production method.

FIGS. 11A to 11C each is a perspective diagram of the ceramic body 11 showing the process in step ST4.

Firstly, as shown in FIG. 11A, by applying the electrical conductive paste to the ceramic body 11, unsintered first and second end external electrodes 14aU, 14bU are formed.

Next, as shown in FIG. 11B, by applying the electrical conductive paste to the ceramic body 11, an unsintered first side face external electrode 15aU is formed.

Furthermore, as shown in FIG. 11C, by applying the electrical conductive paste to the ceramic body 11, an unsintered second side face external electrode 15bU is formed.

For the application of the electrical conductive paste to the ceramic body 11, an application apparatus such as a roller applicator and a dip applicator can be used, for example. Note that the order of the formation of the end external electrodes 14aU, 14bU and the side face external electrodes 15aU, 15bU can be determined arbitrarily.

By baking the end external electrodes 14aU, 14bU and the side face external electrodes 15aU, 15bU shown in FIG. 11C to the ceramic body 11, the end external electrodes 14a, 14b and the side face external electrodes 15a, 15b are formed, thereby providing the multi-layer ceramic capacitor 10 shown in FIG. 1, etc.

The end external electrodes 14aU, 14bU and the side face external electrodes 15aU, 15bU can be baked to the ceramic body 11 under a reduction atmosphere or a low oxygen partial pressure atmosphere, for example. Note that the end external electrodes 14a, 14b and the side face external electrodes 15a, 15b may be a two-layer structure of the base film that is a baked film of the electrical conductive paste and a surface film, or a three-layer structure of a base film, an intermediate film and the surface film, for example.

In the production method according to the embodiment, in order to form the side face external electrodes 15a, 15b, the electrical conductive paste is applied to the first side face S1 and the first side face S2 of the ceramic body 11. Specifically, by applying the electrical conductive paste two times, the side face external electrodes 15a, 15b can be formed. According to the production method in the embodiment, the number of applying the electrical conductive paste can be small, the production process becomes simple, and misalignment of the electrical conductive paste less occurs.

From a standpoint of the production efficiency, it is preferable that large diameter ceramic sheets 16U that are not cut into pieces for a plurality of the multi-layer ceramic capacitors 10 are prepared in step ST1 (ceramic sheet preparation process), and are cut into pieces after step ST2 (lamination process). In the embodiment, for explanation convenience, the ceramic sheets 16U that are cut into pieces are prepared in step ST1. However, a timing of cutting into pieces may be determined arbitrarily.

In the above-described embodiment, after the ceramic body 11 is sintered, the end external electrodes 14a, 14b and the side face external electrodes 15a, 15b are baked. However, the ceramic body 11, the end external electrodes 14a, 14b and the side face external electrodes 15a, 15b may be sintered at the same time.

[Multi-Layer Ceramic Capacitor 10 According to Alternative Embodiments 1, 2]

Figure 12A:
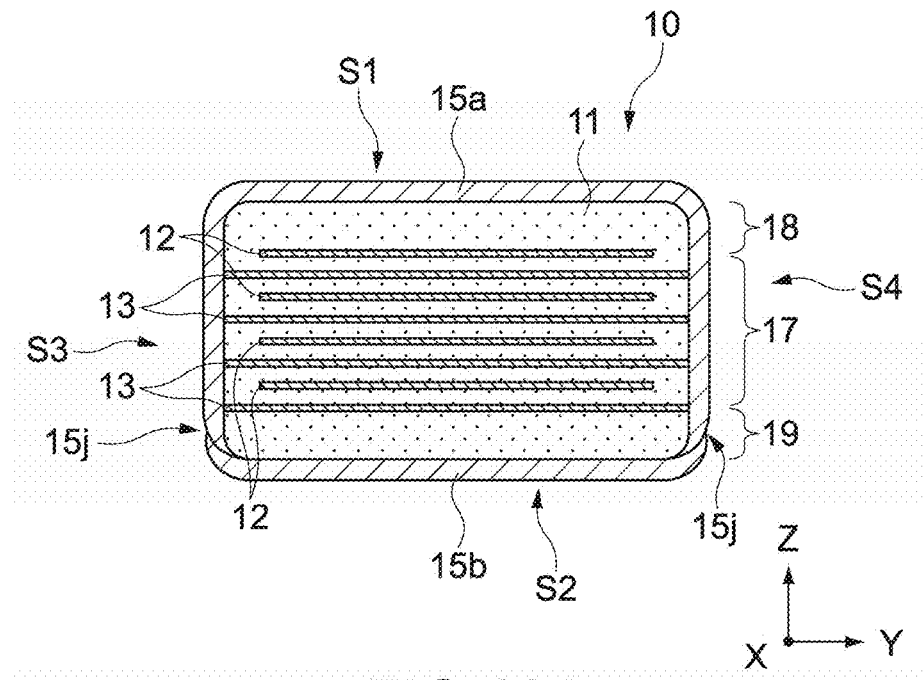
FIG. 12A is a sectional diagram of a multi-layer ceramic capacitor according to alternative embodiment 1 of the first embodiment.
Figure 12B:
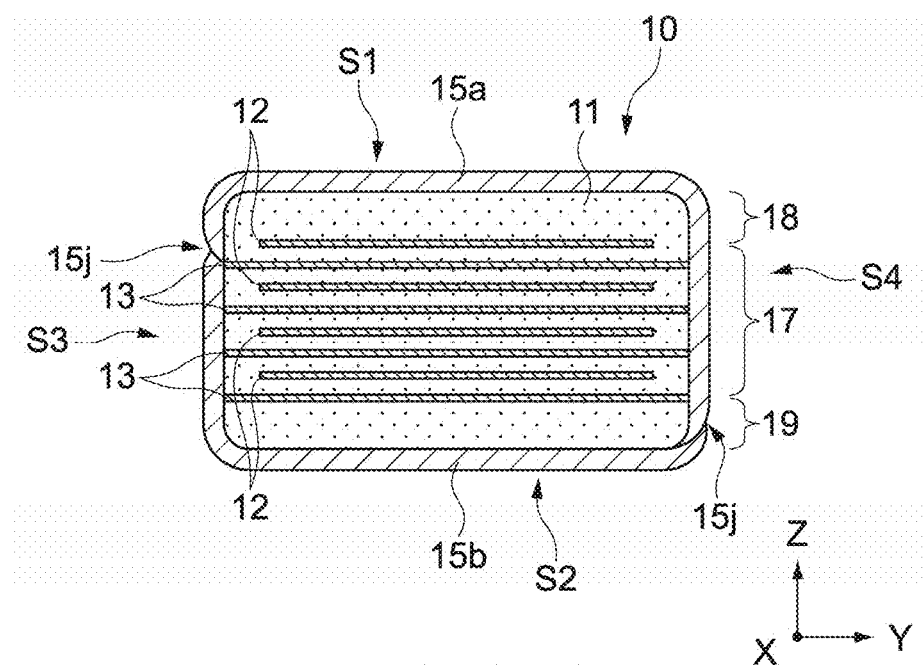
FIG. 12B is a sectional diagram of a multi-layer ceramic capacitor according to alternative embodiment 2 of the first embodiment.

FIGS. 12A and 12B are sectional diagrams of a multi-layer ceramic capacitor 10 according to alternative embodiments 1, 2 of the first embodiment.

In the multi-layer ceramic capacitor 10 according to the alternative embodiment 1 shown in FIG. 12A, a go-around amount of the first side face external electrode 15a to the second side faces S3, S4 is greater than a go-around amount of the second side face external electrode 15b to the second side faces S3, S4. In this manner, in any of the second side faces S3, S4, the first side face external electrode 15a is connected to all second internal electrodes 13 not via the second side face external electrode 15b.

Here, suppose that there are second internal electrodes 13 only connected to the first side face external electrode 15a and the second internal electrodes 13 only connected to the second side face external electrode 15b in the second side faces S3, S4, respectively. In this case, at a boundary between the first side face external electrode 15a and the second side face external electrode 15b, the connection between the second internal electrodes 13 and the side face external electrodes 15a, 15b may become unstable.

In this regard, in the multi-layer ceramic capacitor 10 according to alternative embodiment 1, the second internal electrodes 13 drawn to the second side faces S3, S4 are collectively connected by the first side face external electrode 15a. In this manner, the second internal electrodes 13 and the side face external electrodes 15a, 15b can be connected more reliably.

The first side face external electrode 15a may reach the ridges that connect the second side faces S3, S4 and the first side face S2. However, in view of ensuring the flatness of the second side face external electrode 15b, it is not preferable that the first side face external electrode 15a reaches the first side face S2.

A multi-layer ceramic capacitor 10 according to an alternative embodiment 2 shown in FIG. 12B has a configuration that the second internal electrodes 13 and the side face external electrodes 15a, 15b can be connected more reliably, similar to the alternative embodiment 1.

In other words, in the multi-layer ceramic capacitor 10 according to the alternative embodiment 2, a go-around amount of the second side face external electrode 15b to the second side face S3 is greater than a go-around amount of the first side face external electrode 15a to the second side face S3, dissimilar to the alternative embodiment 1. In this manner, in the second side face S3, the second side face external electrode 15b is connected to all second internal electrodes 13 not via the first side face external electrode 15a.

Thus, when any one of the side face external electrodes 15a, 15b are connected to all second internal electrodes 13 not via the other in the second side faces S3, S4, the effects similar to the alternative embodiment 1 can be provided.

Note that it is not an essential configuration that all areas where the second internal electrodes 13 are drawn are covered with any one of the side face external electrodes 15a, 15b in the second side faces S3, S4.

Figure 13:
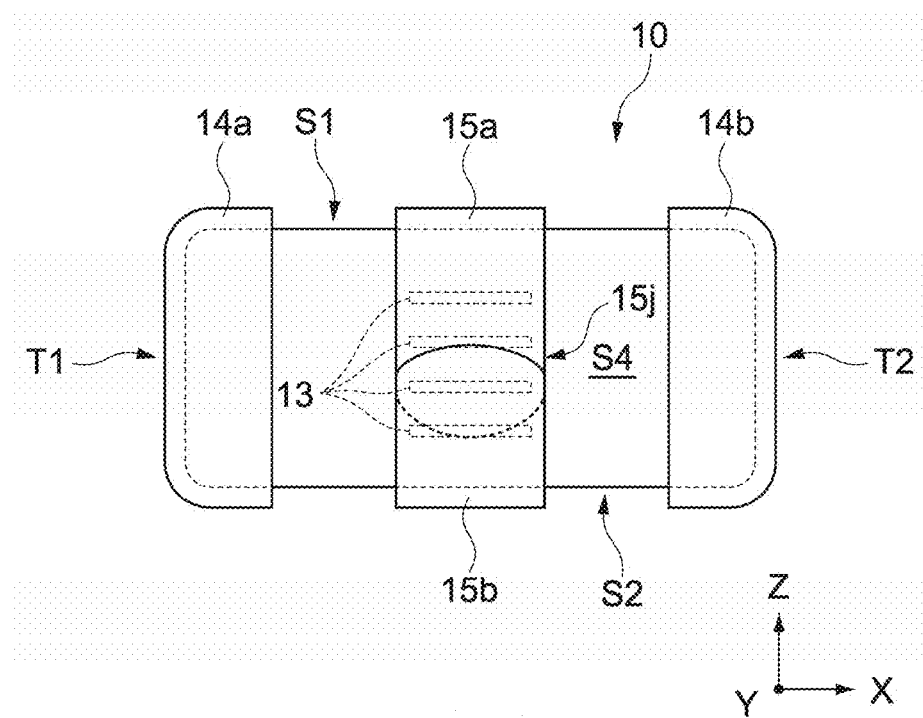
FIG. 13 is a side diagram showing a configuration example of the multi-layer ceramic capacitor according to alternative embodiments 1, 2 of the first embodiment.

For example, as shown in FIG. 13, the first side face external electrode 15a may cover only the second internal electrodes 13 disposed at a lowest part in the Z axis direction and at a center area in the X axis direction, and may not cover both ends in the X axis direction. Also in this case, the second internal electrodes 13 are collectively connected by the first side face external electrode 15a, whereby the second internal electrodes 13 and the side face external electrodes 15a, 15b can be connected more reliably.

[Multi-Layer Ceramic Capacitor 10 According to Alternative Embodiment 3]

Figure 14:
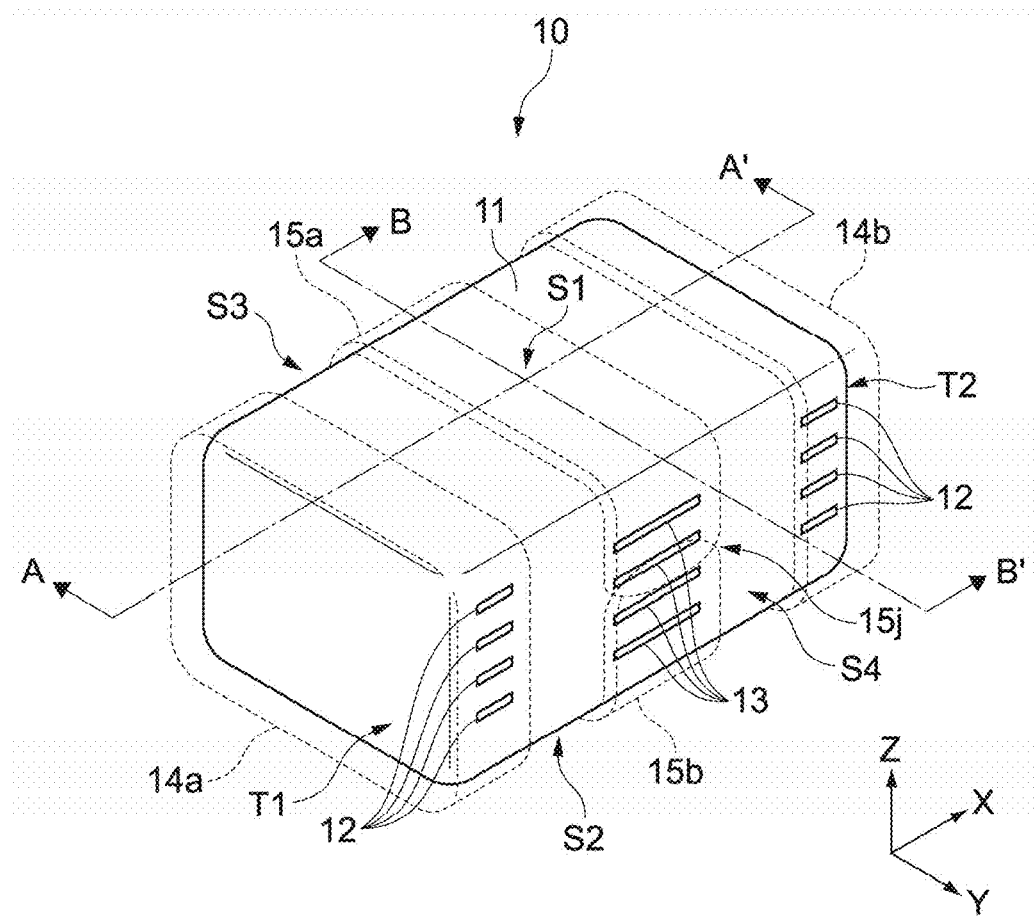
FIG. 14 is a perspective diagram showing the multi-layer ceramic capacitor according to an alternative embodiment 3 of the first embodiment.
Figure 15:
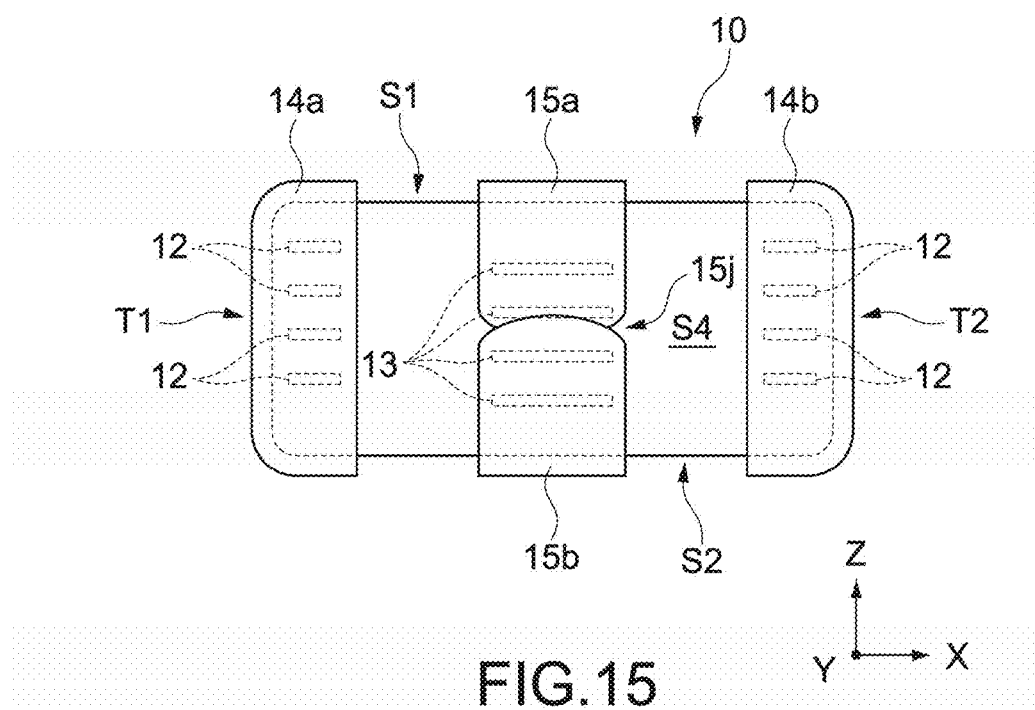
FIG. 15 is a side diagram showing the multi-layer ceramic capacitor according to an alternative embodiment 3 of the first embodiment.
Figure 16:
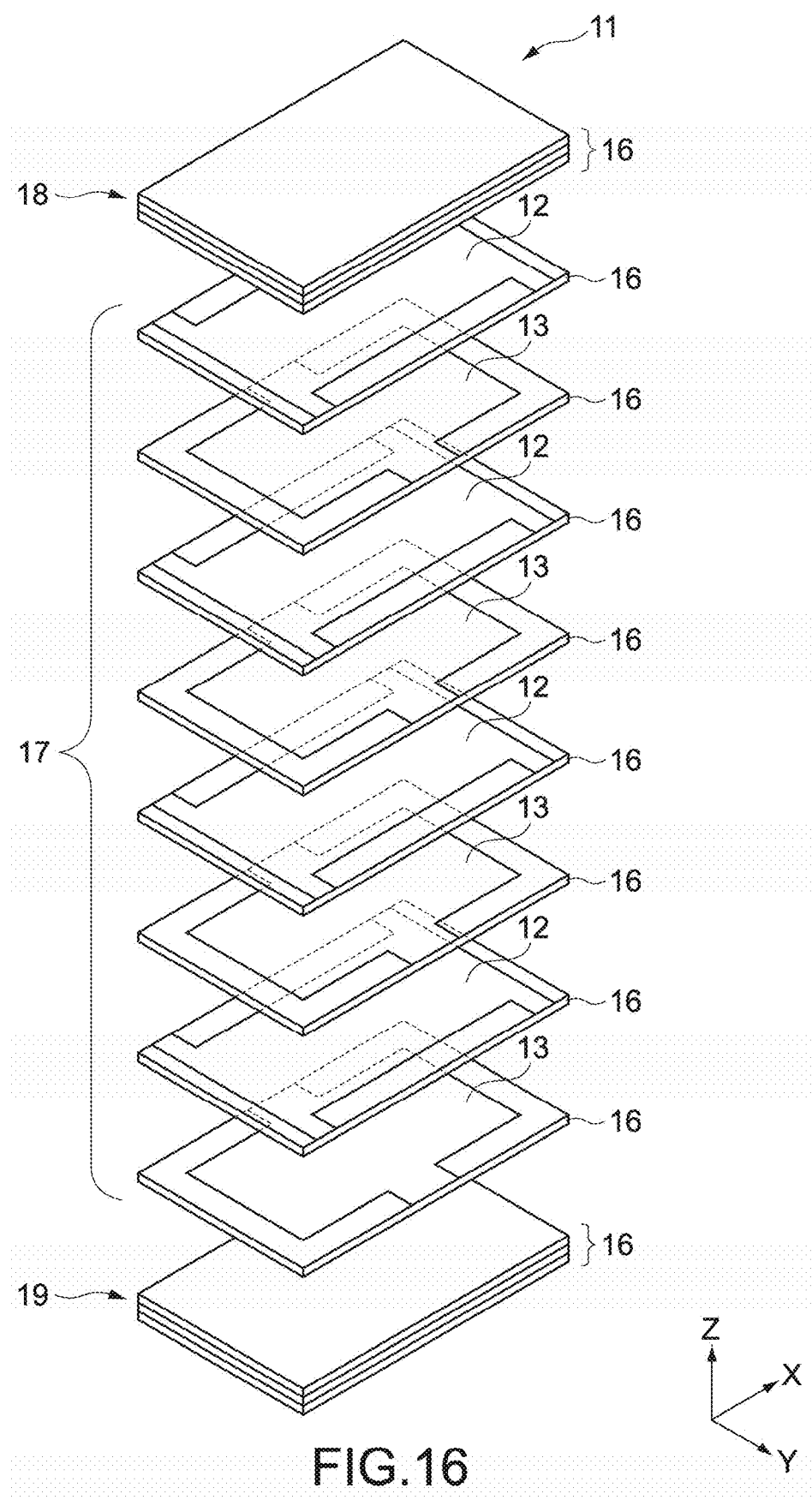
FIG. 16 is an exploded perspective diagram of the multi-layer ceramic capacitor according to the alternative embodiment 3 of the first embodiment.

FIG. 14 is a side diagram of a multi-layer ceramic capacitor 10 according to an alternative embodiment 3 of the first embodiment. FIG. 15 is a side diagram of the multi-layer ceramic capacitor 10, and FIG. 16 is an exploded perspective diagram of the multi-layer ceramic capacitor 10.

In the multi-layer ceramic capacitor 10 according to the alternative embodiment 3, the first internal electrodes 12 are drawn not to the end faces T1, T2, but to both ends at end faces T1, T2 sides of the second side faces S3, S4, dissimilar to the first embodiment. Specifically, the first internal electrodes are covered with extension parts of the end external electrodes 14a, 14b to the second side faces S3, S4. Accordingly, also in the multi-layer ceramic capacitor 10 according to the alternative embodiment 3, the first internal electrodes 12 are connected by the end external electrodes 14a, 14b.

Also in the multi-layer ceramic capacitor 10 according to the alternative embodiment 3, the effects similar to the first embodiment can be provided.

In this way, the first internal electrodes 12 of the multi-layer ceramic capacitor 10 may be drawn to ends at the end faces T1, T2 sides of the ceramic body 11 covered by the end external electrodes 14a, 14b, and may be drawn to the second side faces S3, S4.

In this case, the end external electrodes 14a, 14b may not cover the end faces T1, T2, but cover only the both ends of the side faces S1, S2, S3, S4 in the X axis direction. Furthermore, the end external electrode 14 may cover only the area where the first internal electrodes 12 are drawn in the second side faces S3, S4.

Figure 17:
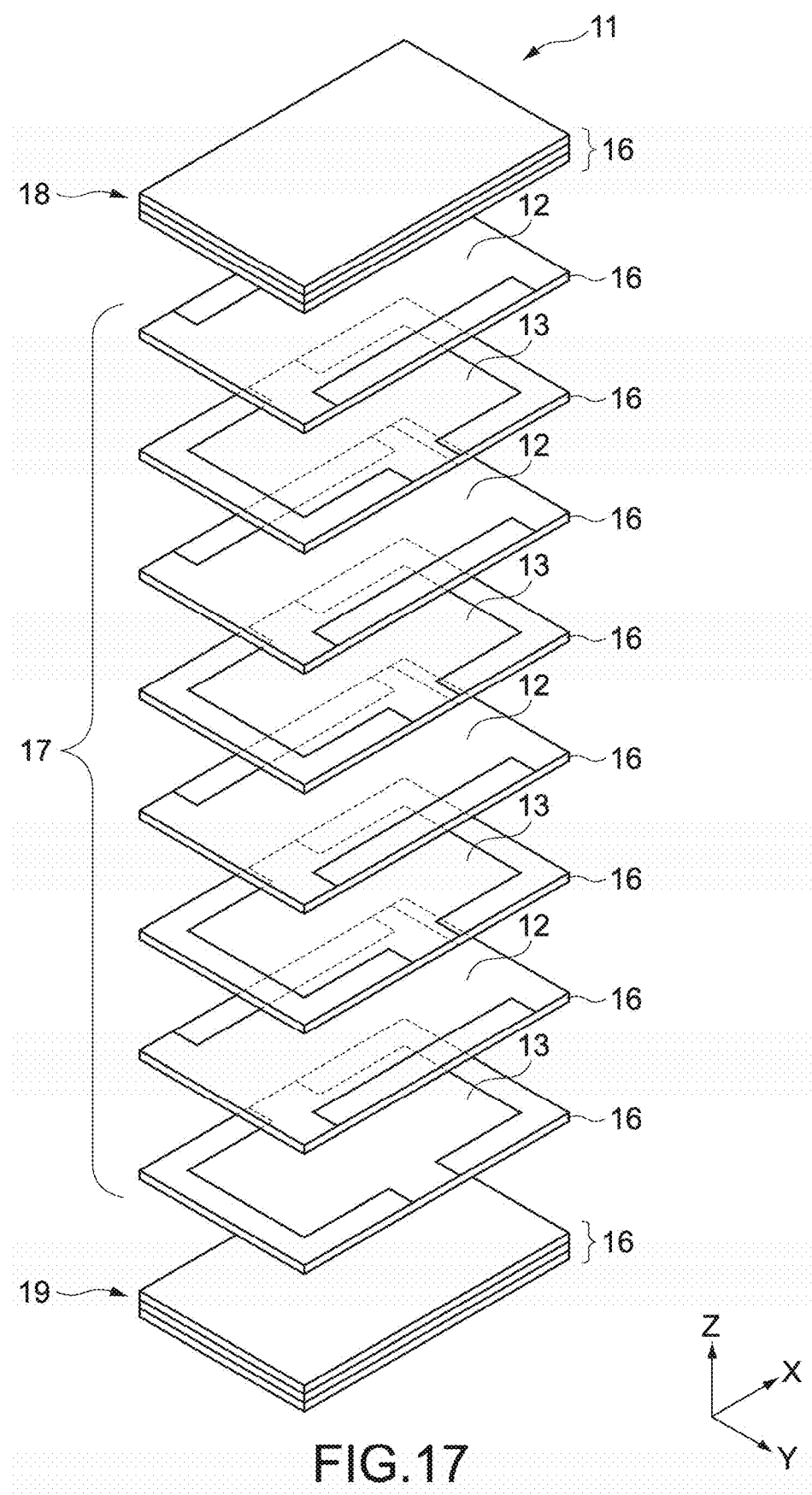
FIG. 17 is an exploded perspective diagram showing a configuration example of the multi-layer ceramic capacitor according to the alternative embodiment 3 of the first embodiment.

In addition, as shown in FIG. 17, the first internal electrodes 12 may be drawn over both of the end faces T1, T2 and the second side faces S3, S4.

Second Embodiment

A multi-layer ceramic capacitor 10 according to a second embodiment of the present invention will be described. In the second embodiment, descriptions about the configurations common to those in the first embodiment are omitted, as appropriate. As to the configurations in the second embodiment corresponding to those in the first embodiment, symbols similar to the first embodiment are used.

[Configuration of Multi-Layer Ceramic Capacitor 10]

Figure 18:
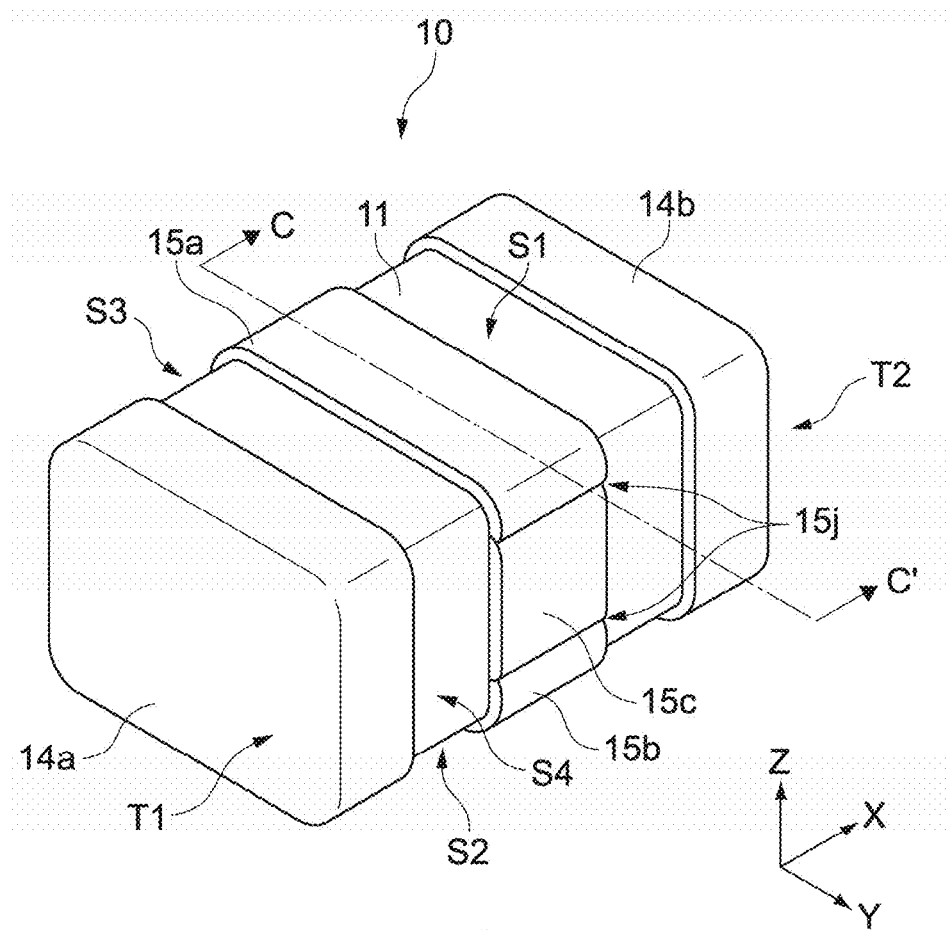
FIG. 18 is a perspective diagram of a multi-layer ceramic capacitor according to a second embodiment of the present invention.
Figure 19:
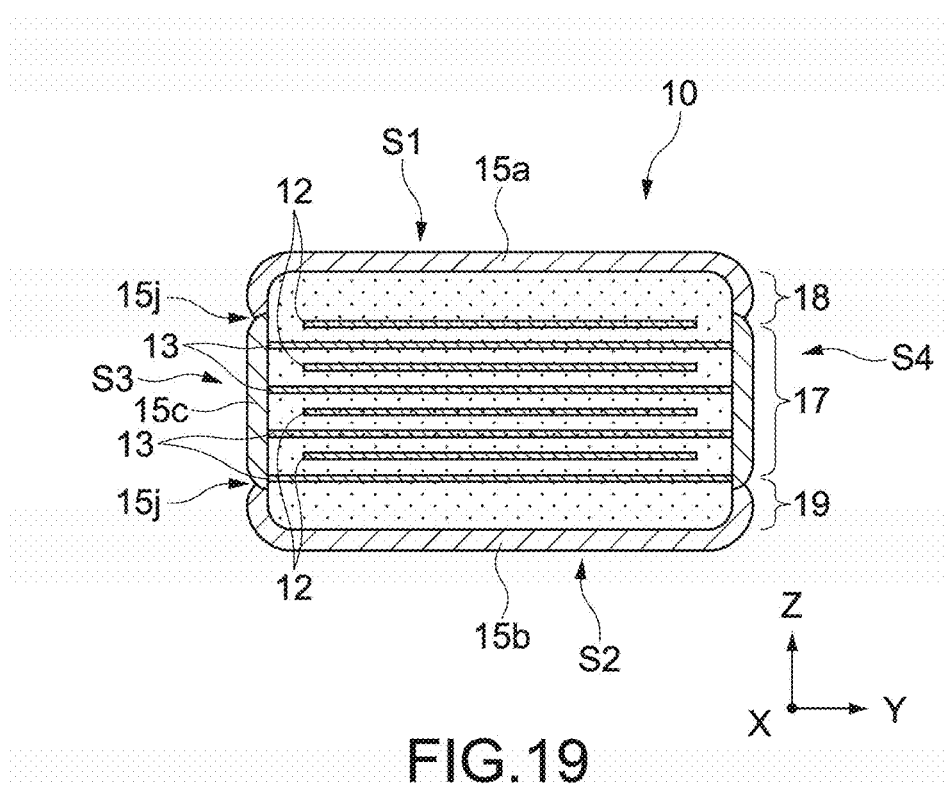
FIG. 19 is a sectional diagram along a C-C' line of the multi-layer ceramic capacitor in FIG. 18.

FIG. 18 is a perspective diagram of the multi-layer ceramic capacitor 10 according to the second embodiment. FIG. 19 is a sectional diagram along a C-C' line of the multi-layer ceramic capacitor 10 in FIG. 18.

The multi-layer ceramic capacitor 10 according to the second embodiment includes third side face external electrode 15c disposed at the second side faces S3, S4 in a similar way to the first and second side face external electrodes 15a, 15b. The third side face external electrode 15c has a dimension in the X axis direction similar to those of the first and second side face external electrodes 15a, 15b, and covers a center area of the second side faces S3, S4 in the Z axis direction.

The first and second side face external electrodes 15a, 15b are connected via the third side face external electrode 15c. Specifically, on the second side faces S3, S4, the connection parts 15j of the first side face external electrode 15a and the third side face external electrode 15c, and the connection parts 15j of the second side face external electrode 15b and the third side face external electrode 15c are disposed.

In the multi-layer ceramic capacitor 10 according to the second embodiment, as a go-around amount of the first and second side face external electrodes 15a, 15b to the second side faces S3, S4 is small, the first and second side face external electrodes 15a, 15b can be easily formed.

It is also preferable that the third side face external electrode 15c cover the capacitance forming part 17 of the ceramic body 11. Specifically, the connection parts 15j formed on the second side faces S3, S4 are preferably disposed on the covers 18, 19. In this case, as the second internal electrodes 13 are collectively connected only by the third side face external electrode 15c, the second internal electrodes 13 and the side face external electrodes 15a, 15b, 15c can be connected more reliably.

[Method of Producing Multi-Layer Ceramic Capacitor 10]

A method of producing the multi-layer ceramic capacitor 10 according to the second embodiment is common to the first embodiment as to steps ST1 to ST3 shown in FIG. 8 and is different from the first embodiment only as to step ST4.

Figure 20A:
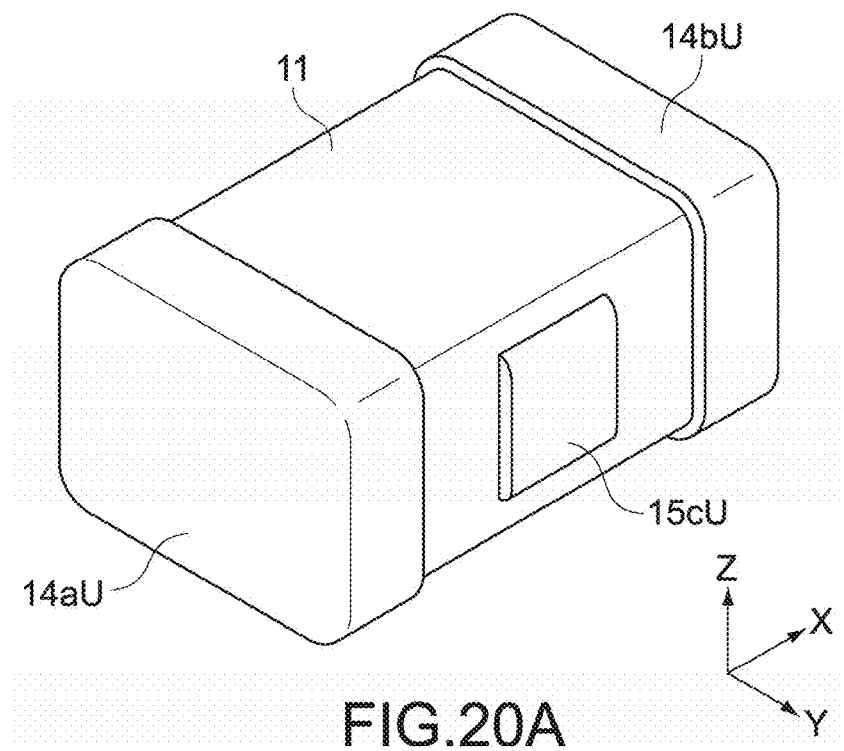
FIG. 20A is a perspective diagram showing a process of producing the multi-layer ceramic capacitor.
Figure 20B:
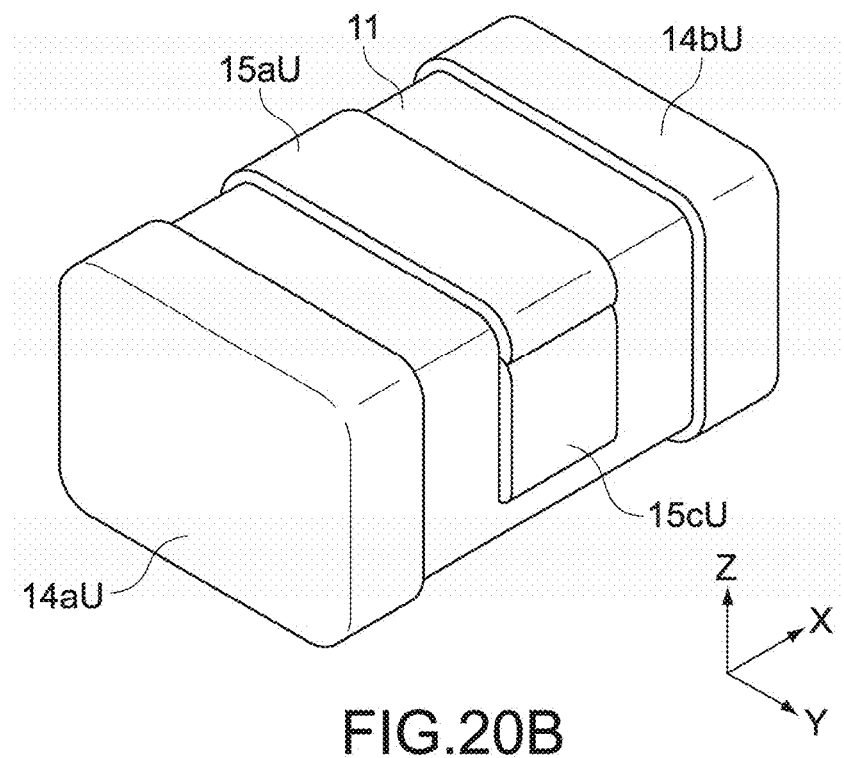
FIG. 20B is a perspective diagram showing a process of producing the multi-layer ceramic capacitor.

FIGS. 20A, 20B each is a perspective diagram of the ceramic body 11 showing a process of step ST4.

Firstly, as shown in FIG. 20A, by applying the electrical conductive paste to the ceramic body 11 where the unsintered first and second end external electrode 14aU, 14bU are formed, an unsintered third side face external electrode 15cU is formed.

Next, as shown in FIG. 20B, by applying the electrical conductive paste to the ceramic body 11, an unsintered first side face external electrode 15aU is formed. Furthermore, by applying the electrical conductive paste to the ceramic body 11, an unsintered second side face external electrode 15bU is formed.

Then, by baking the ceramic body 11 to the end external electrodes 14aU, 14bU and the side face external electrodes 15aU, 15bU, 15cU, the end external electrode 14a, 14, and the side face external electrodes 15a, 15b, 15c are formed, thereby providing the multi-layer ceramic capacitor 10 as shown in FIG. 18, etc.

The third side face external electrode 15c may be formed only at the second side faces S3, S4, and does not need to go around the first side face S1, S2. Therefore, the method is not limited to bake the electrical conductive paste. By a variety of methods, the third side face external electrode 15c can be formed. Examples include a vapor deposition method, a sputtering method, a plating method, and a printing method.

[Multi-Layer Ceramic Capacitor 10 According to Alternative Embodiment 1]

Figure 21A:
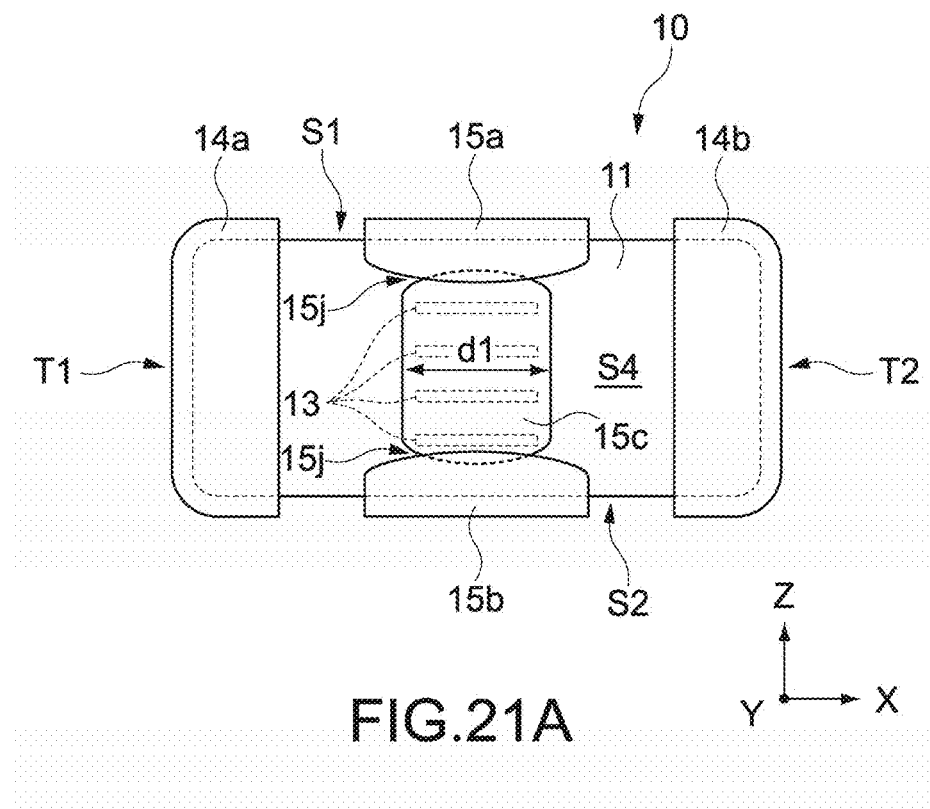
FIG. 21A is a side diagram showing a multi-layer ceramic capacitor according to an alternative embodiment 1 of the second embodiment.
Figure 21B:
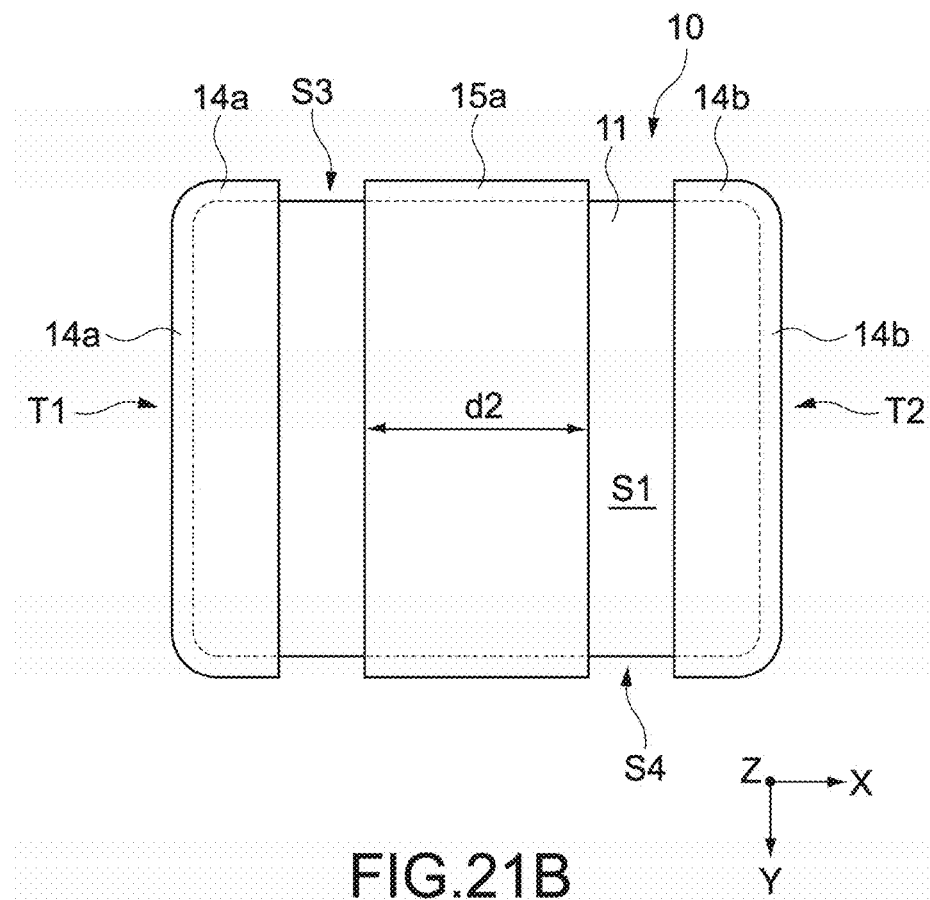
FIG. 21B is a plan diagram showing a multi-layer ceramic capacitor according to an alternative embodiment 1 of the second embodiment.

FIGS. 21A, 21B each is a multi-layer ceramic capacitor 10 according to an alternative embodiment 1 of the second embodiment. FIG. 21A is a side diagram of the multi-layer ceramic capacitor 10, and FIG. 21B is a plan diagram of the multi-layer ceramic capacitor 10.

In the multi-layer ceramic capacitor 10 according to the alternative embodiment 1, the third side face external electrode 15c is formed to entirely cover the second internal electrode 13 drawn to the second side faces S3, S4. The third side face external electrode 15c is formed to fit a drawn width of the second internal electrode 13 such that a width d1 in the X axis direction is as narrow as possible.

In this manner, while a good connection between the third side face external electrode 15c and the second internal electrode 13 is kept, it becomes possible to dispose the third side face external electrode 15c connected to the second internal electrode 13 sufficiently apart from the end external electrodes 14a, 14b. Thus, a short circuit caused by a creeping discharge can be inhibited between the third side face external electrode 15c and end the external electrodes 14a, 14b, for example.

However, when the widths of the side face external electrodes 15a, 15b, 15c in the X axis direction are same in the second embodiment (FIG. 18, etc.), a sufficiently large area that is connected to the mounting surface of the substrate may not be provided in the first side face external electrode 15a or the second side face external electrode 15b. This does not allow a good connection to the mounting surface of the substrate in the multi-layer ceramic capacitor 10.

Then, in the multi-layer ceramic capacitor 10 according to the alternative embodiment 1, as shown in FIGS. 21A, 21B, widths d2 of the first side face external electrode 15a and the second side face external electrode 15b in the X axis direction are made wider than the width d1 of the third side face external electrode 15c in the X axis direction.

The widths d2 of the first side face external electrode 15a and the second side face external electrode 15b can be measured at a center part of the first side faces S1, S2 in the Y axis direction. The width d1 of the third side face external electrode 15c can be measured at a center of the second side faces S3, S4 in the Z axis direction.

In this manner, in the multi-layer ceramic capacitor 10 according to the alternative embodiment 1, it can ensure sufficient large areas of the first and second side face external electrodes 15a, 15b on the first side faces S1, S2. Accordingly, by the configuration of the alternative embodiment 1, a good connection between the multi-layer ceramic capacitor 10 and the mounting surface of the substrate can be easily provided.

The widths d2 of the first side face external electrode 15a and the second side face external electrode 15b may be different. In particular, only one of the widths d2 of the first side face external electrode 15a and the second side face external electrode 15b may be greater than the width d1 of the third side face external electrode 15c.

For example, when the mounting surface of the substrate is determined to the first side face S1 in advance, only the width d2 of the first side face external electrode 15a may be widen. In an opposite way, when the mounting surface of the substrate is determined to the first side face S2, only the width d2 of the second side face external electrode 15b may be widen.

Also, in the multi-layer ceramic capacitor 10 according to the alternative embodiment 1, as the first and second side face external electrodes 15a, 15b are formed over a wide range in the X axis direction, even if the third side face external electrode 15c is more or less deviated in the X axis direction, it ensures a good connection between the first and second side face external electrodes 15a, 15b and the third side face external electrode 15c. It surely provides the multi-layer ceramic capacitor 10 according to the alternative embodiment 1 with high reliability.

[Multi-Layer Ceramic Capacitor 10 According to Alternative Embodiment 2]

Figure 22A:
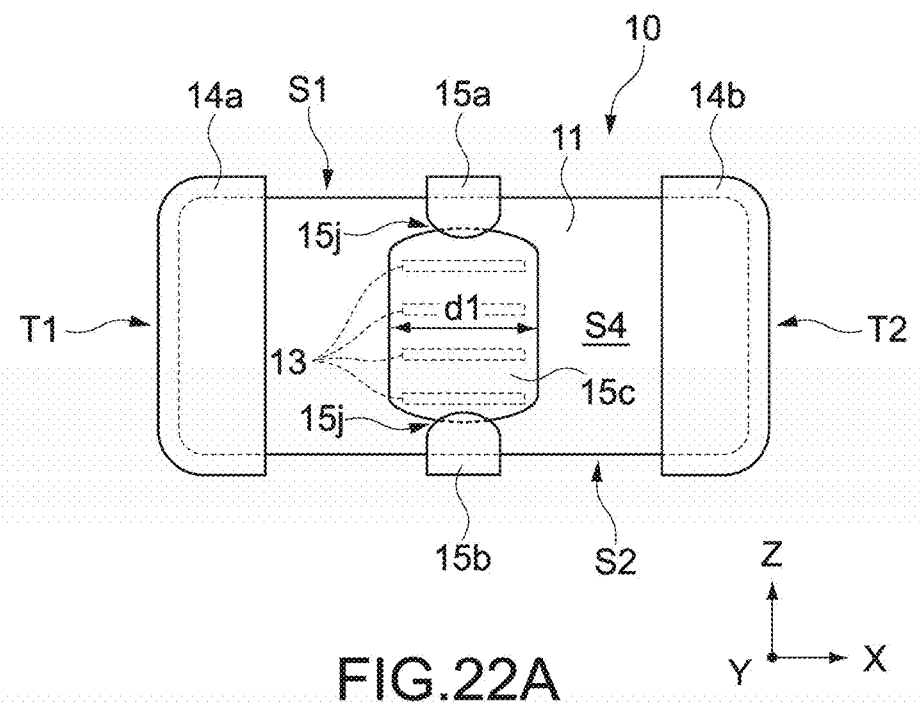
FIG. 22A is a side diagram showing a multi-layer ceramic capacitor according to an alternative embodiment 2 of the second embodiment.
Figure 22B:
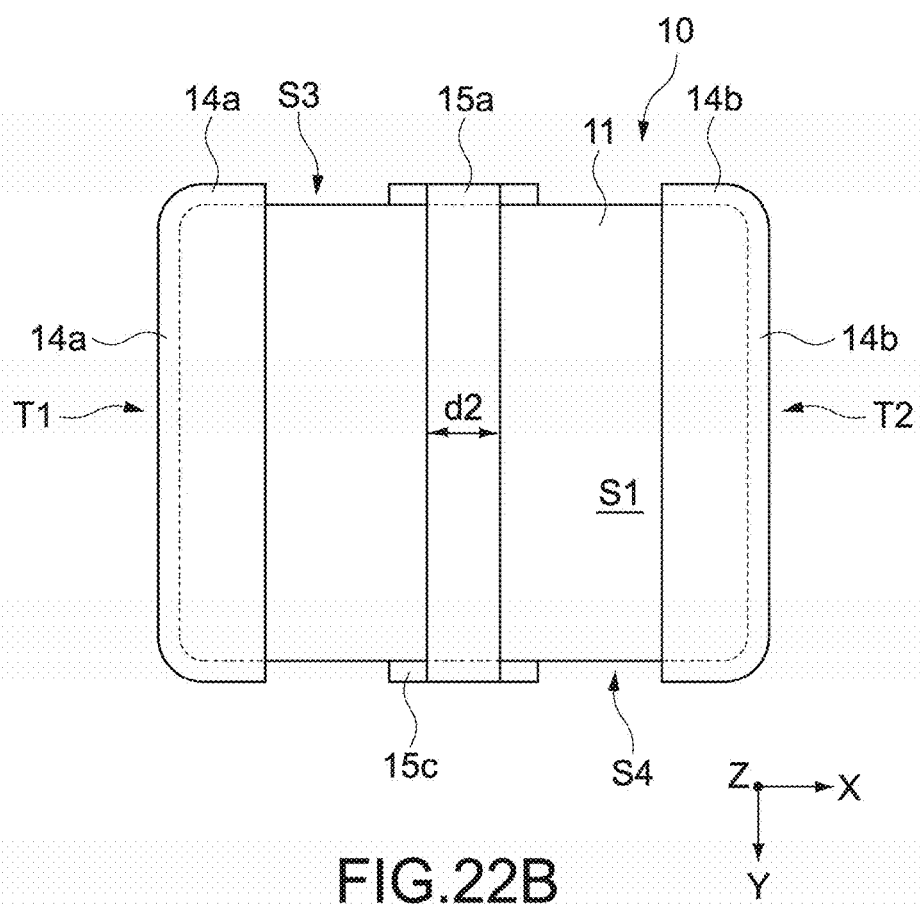
FIG. 22B is a plan diagram showing a multi-layer ceramic capacitor according to the alternative embodiment 2 of the second embodiment.

FIG. 22A and FIG. 22B each is a diagram showing a multi-layer ceramic capacitor 10 according to an alternative embodiment 2 of the second embodiment. FIG. 22A is a side diagram showing the multi-layer ceramic capacitor 10. FIG. 22B is a plan diagram showing the multi-layer ceramic capacitor 10.

In the multi-layer ceramic capacitor 10 according to the alternative embodiment 2, the third side face external electrode 15c is also formed to entirely cover the second internal electrode 13 drawn to the second side faces S3, S4. The third side face external electrode 15c is formed to fit the drawn width of the second internal electrode 13 such that the width d1 in the X axis direction is as narrow as possible.

However, as in the second embodiment, when the widths of the side face external electrodes 15a, 15b, 15c in the X axis direction are same and the drawn width of the second internal electrode 13 is wide, the distances between the end external electrodes 14a, 14b and the side face external electrodes 15a, 15b, 15c become small for the whole circumference. This may easily cause a short circuit between the side face external electrodes 15a, 15b, 15c and the end external electrodes 14a, 14b.

Then, in the multi-layer ceramic capacitor 10 according to an alternative embodiment 2, widths d2 of the first side face external electrode 15a and the second side face external electrode 15b in the X axis direction are made narrower than the width d1 of the third side face external electrode 15c in the X axis direction.

In this manner, in the multi-layer ceramic capacitor 10 according to the alternative embodiment 2, the first and second side face external electrode 15a, 15b can be disposed sufficiently apart from the end external electrode 14a, 14b. This can inhibit a short circuit between the first and second side face external electrodes 15a, 15b and the end external electrodes 14a, 14b.

In particular, the multi-layer ceramic capacitor 10 according to the alternative embodiment 2 can effectively inhibit a short circuit between the first side face external electrode 15a or the second side face external electrode 15b and the end external electrodes 14a, 14b by conduction via solder on the mounting surface of the substrate. This ensures high reliability in the multi-layer ceramic capacitor 10.

The widths d2 of the first side face external electrode 15a and the second side face external electrode 15b may be different. In particular, only one of the widths d2 of the first side face external electrode 15a and the second side face external electrode 15b may be narrower than the width d1 of the third side face external electrode 15c.

For example, when the mounting surface of the substrate is determined to the first side face S1 in advance, only the width d2 of the first side face external electrode 15a may be narrowed. In an opposite way, when the mounting surface of the substrate is determined to the first side face S2, only the width d2 of the second side face external electrode 15b may be narrowed.

Other Embodiments

While the embodiments of the present invention have been described, the present invention is not limited to the above-described embodiments, and it should be appreciated that variations and modifications may be made without departing from the scope of the present invention.

For example, although the connection parts 15j of the side face external electrodes 15a, 15b are disposed at the second side faces S3, S4 to which the second internal electrodes 13 of the ceramic body 11 are drawn, this configuration is not essential.

More specifically, the connection parts 15j of the side face external electrodes 15a, 15b may be disposed at the first side faces S1, S2 to which no second internal electrodes 13 are drawn, as necessary. In other words, the side face external electrodes 15a, 15b may be formed so as to go around from the second side faces S3, S4 to the first side faces S1, S2.

Also in this case, it can inhibit the widths of the side face external electrode 15a, 15b from widening in the vicinity of the ridges of the ceramic body 11, thereby providing the multi-layer ceramic capacitor 10 where insulation failure less occurs.

Furthermore, in this case, the second internal electrodes 13 drawn to the second side faces S3, S4 are collectively connected by the first side face external electrode 15a or the second side face external electrode 15b. Accordingly, the second internal electrodes 13 and the side face external electrodes 15a, 15b can be connected more reliably not depending on a connection mode of the side face external electrodes 15a, 15b.

In addition, the present invention is applicable to any multi-layer ceramic electronic component where side face external electrodes are formed on the whole circumference of four side faces other than the multi-layer ceramic capacitor. Examples of the multi-layer ceramic electronic component other than the multi-layer ceramic capacitor include a dielectric filter, for example.

A dimension of each component (such as side face external electrode) of the multi-layer ceramic capacitor may be an average value provided by measuring 25 samples randomly taken for representing a lot. Also, the dimension of each sample may be measured by a factory microscope, or may be read for a numerical value from an image acquired using an optical microscope or a scanning electron microscope by referring to a scale. In this case, the dimension may be measured at a polished cross-section of the samples to be measured, as necessary.

It should be understood by those skilled in the art that various modifications, combinations, sub-combinations and alterations may occur depending on design requirements and other factors insofar as they are within the scope of the appended claims or the equivalents thereof.

What is claimed is:

1. A multi-layer ceramic electronic component, comprising:
    a ceramic body including
        a pair of end faces, a pair of first side faces, and a pair of second side faces all of which face each other,
        a plurality of ceramic layers extending along a pair of the first side faces and laminating along a pair of the second side faces, and
        an internal electrode unit having first and second internal electrodes disposed alternately between a plurality of the ceramic layers, the first internal electrodes drawn to both ends of a pair of the end faces, and the second internal electrodes drawn to both ends of a pair of the second side faces;
    an end external electrode unit connected to the first internal electrodes; and
    a side face external electrode unit connected to the second internal electrodes and having first and second side face external electrodes that go around from a pair of the first side faces to a pair of the second side faces and are connected to each other at a pair of the second side faces, a go-around amount of the first side face external electrode to one side face of a pair of the second side faces being greater than a go-around amount of the second side face external electrode to the one side face of a pair of the second side faces, a go-around amount of the second side face external electrode to another side face of a pair of the second side faces being greater than a go-around amount of the first side face external electrode to the other side face of a pair of the second side faces,
    wherein the first side face external electrode is a single, monolithic element and the second side face external electrode is a single, monolithic element.

2. The multi-layer ceramic electronic component, according to claim 1, wherein
    any one of the first and second side face external electrodes is configured to be connected to a built-in component substrate in any one of a pair of the first side faces.

3. The multi-layer ceramic electronic component, according to claim 2, wherein
    the first side face external electrode is connected to all of the second internal electrodes at the one side face of a pair of the second side faces, and
    the second side face external electrode is connected to all of the second internal electrodes at the other side face of a pair of the second side faces.

4. The multi-layer ceramic electronic component, according to claim 3, wherein
a thickness in a direction perpendicular to a pair of the first side faces is 50% or less of a width in a direction perpendicular to a pair of the second side faces in the ceramic body.

5. The multi-layer ceramic electronic component, according to claim 4, wherein
a thickness of the ceramic body in a direction perpendicular to a pair of the first side faces is 80% or less of a width of the side face external electrode unit in a direction perpendicular to a pair of the end faces.

6. The multi-layer ceramic electronic component, according to claim 3, wherein
a thickness of the ceramic body in a direction perpendicular to a pair of the first side faces is 80% or less of a width of the side face external electrode unit in a direction perpendicular to a pair of the end faces.

7. The multi-layer ceramic electronic component, according to claim 2, wherein
a thickness in a direction perpendicular to a pair of the first side faces is 50% or less of a width in a direction perpendicular to a pair of the second side faces in the ceramic body.

8. The multi-layer ceramic electronic component, according to claim 7, wherein
a thickness of the ceramic body in a direction perpendicular to a pair of the first side faces is 80% or less of a width of the side face external electrode unit in a direction perpendicular to a pair of the end faces.

9. The multi-layer ceramic electronic component, according to claim 2, wherein
a thickness of the ceramic body in a direction perpendicular to a pair of the first side faces is 80% or less of a width of the side face external electrode unit in a direction perpendicular to a pair of the end faces.

10. The multi-layer ceramic electronic component, according to claim 1, wherein
the first side face external electrode is connected to all of the second internal electrodes at the one side face of a pair of the second side faces, and
the second side face external electrode is connected to all of the second internal electrodes at the other side face of a pair of the second side faces.

11. The multi-layer ceramic electronic component, according to claim 10, wherein
a thickness in a direction perpendicular to a pair of the first side faces is 50% or less of a width in a direction perpendicular to a pair of the second side faces in the ceramic body.

12. The multi-layer ceramic electronic component, according to claim 11, wherein
a thickness of the ceramic body in a direction perpendicular to a pair of the first side faces is 80% or less of a width of the side face external electrode unit in a direction perpendicular to a pair of the end faces.

13. The multi-layer ceramic electronic component, according to claim 10, wherein
a thickness of the ceramic body in a direction perpendicular to a pair of the first side faces is 80% or less of a width of the side face external electrode unit in a direction perpendicular to a pair of the end faces.

14. The multi-layer ceramic electronic component, according to claim 1, wherein
a thickness in a direction perpendicular to a pair of the first side faces is 50% or less of a width in a direction perpendicular to a pair of the second side faces in the ceramic body.

15. The multi-layer ceramic electronic component, according to claim 14, wherein
a thickness of the ceramic body in a direction perpendicular to a pair of the first side faces is 80% or less of a width of the side face external electrode unit in a direction perpendicular to a pair of the end faces.

16. The multi-layer ceramic electronic component, according to claim 1, wherein
a thickness of the ceramic body in a direction perpendicular to a pair of the first side faces is 80% or less of a width of the side face external electrode unit in a direction perpendicular to a pair of the end faces.

17. A method of producing a multi-layer ceramic electronic component, comprising:
preparing a ceramic body including
a pair of end faces, a pair of first side faces, and a pair of second side faces all of which face each other,
a plurality of ceramic layers extending along a pair of the first side faces and laminating along a pair of the second side faces,
and an internal electrode unit having first and second internal electrodes disposed alternately between a plurality of the ceramic layers, the first internal electrodes drawn to both ends of a pair of the end faces, and the second internal electrodes drawn to both ends of a pair of the second side faces; and
disposing an end external electrode unit connected to the first internal electrodes; and
disposing a side face external electrode unit connected to the second internal electrodes and having first and second side face external electrodes that go around from a pair of the first side faces to a pair of the second side faces and are connected to each other at a pair of the second side faces, a go-around amount of the first side face external electrode to one side face of a pair of the second side faces being greater than a go-around amount of the second side face external electrode to the one side face of a pair of the second side faces, a go-around amount of the second side face external electrode to another side face of a pair of the second side faces being greater than a go-around amount of the first side face external electrode to the other side face of a pair of the second side faces,
wherein the first side face external electrode is a single, monolithic element and the second side face external electrode is a single, monolithic element.

* * * * *